United States Patent
Hirozawa et al.

(10) Patent No.: US 10,183,254 B2
(45) Date of Patent: Jan. 22, 2019

(54) SEPARATION MEMBRANE ELEMENT

(71) Applicant: TORAY INDUSTRIES, INC., Tokyo (JP)

(72) Inventors: Hiroho Hirozawa, Otsu (JP); Hiroshi Ogawa, Otsu (JP); Kenji Hayashida, Otsu (JP); Masanori Endo, Otsu (JP); Masashi Ito, Otsu (JP)

(73) Assignee: Toray Industries, Inc., Tokyo (JP)

( * ) Notice: Subject to any disclaimer, the term of this patent is extended or adjusted under 35 U.S.C. 154(b) by 64 days.

(21) Appl. No.: 15/538,886

(22) PCT Filed: Dec. 21, 2015

(86) PCT No.: PCT/JP2015/085663
§ 371 (c)(1),
(2) Date: Jun. 22, 2017

(87) PCT Pub. No.: WO2016/104419
PCT Pub. Date: Jun. 30, 2016

(65) Prior Publication Data
US 2017/0361280 A1    Dec. 21, 2017

(30) Foreign Application Priority Data

Jul. 30, 2015    (JP) ................................ 2015-150355

(51) Int. Cl.
*B01D 63/10*    (2006.01)
*B01D 63/00*    (2006.01)

(52) U.S. Cl.
CPC ............ *B01D 63/10* (2013.01); *B01D 63/00* (2013.01); *B01D 2325/02* (2013.01); *B01D 2325/04* (2013.01)

(58) Field of Classification Search
None
See application file for complete search history.

(56) References Cited

U.S. PATENT DOCUMENTS 3,367,504 A      2/1968    Westmoreland
9,808,767 B2 *   11/2017   Tabayashi ............ B01D 63/103
(Continued)

FOREIGN PATENT DOCUMENTS

EP    2742992 A1    6/2014
EP    2786798 A1    10/2014
(Continued)

OTHER PUBLICATIONS

Extended European Search Report for European Application No. 15 872 987.1, dated Jun. 8, 2018, 10 pages.
(Continued)

*Primary Examiner* — Krishnan S Menon
(74) *Attorney, Agent, or Firm* — RatnerPrestia

(57) ABSTRACT

A separation membrane element of the present invention includes: a separation membranes each having a feed-side face and a permeate-side face and forming a separation membrane pair by being arranged so that the permeate-side faces face each other; and a permeate-side channel material provided between the permeate-side faces of the separation membranes, the permeate-side channel material includes a sheet and a plurality of projections formed on the sheet, the sheet is a porous sheet having pores on a surface thereof, and has densely fused parts, coarsely fused parts and non-fused parts on the surface, and the projections contain a resin, and a part of the resin is impregnated into the pores of the sheet.

6 Claims, 7 Drawing Sheets

(56) References Cited

U.S. PATENT DOCUMENTS

| | | |
|---|---|---|
| 2010/0006504 A1 | 1/2010 | Odaka et al. |
| 2012/0018366 A1 | 1/2012 | Buser et al. |
| 2012/0261333 A1 | 10/2012 | Moran et al. |
| 2014/0231332 A1 | 8/2014 | Hirozawa et al. |
| 2014/0251896 A1 | 9/2014 | Hirozawa et al. |

FOREIGN PATENT DOCUMENTS

| | | |
|---|---|---|
| JP | 1969014216 | 6/1969 |
| JP | 0411928 A | 1/1992 |
| JP | 11226366 A | 8/1999 |
| JP | 2006247453 A | 9/2006 |
| JP | 2012518538 A | 8/2012 |
| JP | 2014522294 A | 9/2014 |
| WO | 02052084 A2 | 7/2002 |
| WO | 2007114069 A1 | 10/2007 |
| WO | 2013047744 A1 | 4/2013 |

OTHER PUBLICATIONS

International Search Report and Written Opinion for International Application No. PCT/JP2015/085663, dated Mar. 15, 2016—7 Pages.

Young You, et al., "Thermal interfiber bonding of electrospun poly(L-lactic acid) nanofibers", Materials Letters, vol. 60, No. 11, Dec. 9, 2005 (Dec. 9, 2005), pp. 1331-1333.

\* cited by examiner

SEPARATION MEMBRANE ELEMENT

CROSS REFERENCE TO RELATED APPLICATIONS

This is the U.S. National Phase application of PCT/JP2015/085663, filed Dec. 21, 2015, which claims priority to Japanese Patent Application No. 2014-264344, filed Dec. 26, 2014, Japanese Patent Application No. 2015-087253, filed Apr. 22, 2015, and Japanese Patent Application No. 2015-150355, filed Jul. 30, 2015, the disclosures of each of these applications being incorporated herein by reference in their entireties for all purposes.

TECHNICAL FIELD OF THE INVENTION

The present invention relates to a separation membrane element for use in separation of ingredients contained in fluids such as liquid and gas.

BACKGROUND OF THE INVENTION

In the recent technique for removal of ionic substances contained in seawater, brackish water or the like, separation methods utilizing separation membrane elements have found increasing uses as processes for energy savings and conservation of resources. Separation membranes adopted in the separation methods utilizing separation membrane elements are classified into five groups according to their pore sizes and separation performance, namely microfiltration membranes, ultrafiltration membranes, nanofiltration membranes, reverse osmosis membranes and forward osmosis membranes. These membranes have been used, for example, in production of drinkable water from seawater, brackish water, water containing deleterious substances, or the like, production of ultrapure water for industrial uses, effluent treatment, recovery of valuable substances, or the like, and have been used properly according to ingredients targeted for separation and separation performance requirements.

Separation membrane elements have various shapes, but they are common in that they feed raw water to one surface of a separation membrane and obtain a permeated fluid from the other surface thereof. By having a plurality of separation membranes tied in a bundle, each separation membrane element is configured to extend the membrane area per separation membrane element, in other words, to increase the amount of a permeated fluid obtained per separation membrane element. Various types of shapes, such as a spiral type, a hollow fiber type, a plate-and-frame type, a rotating flat-membrane type and a flat-membrane integration type, have been proposed for separation membrane elements, according to their uses and purposes.

For example, spiral-type separation membrane elements have been widely used in reverse osmosis filtration. The spiral-type separation membrane element is provided with a central tube and a stack wound up around the central tube. The stack is formed by stacking a feed-side channel material for feeding raw water (that is, water to be treated) to a surface of a separation membrane, a separation membrane for separating ingredients contained in the raw water and a permeate-side channel material for leading into the central tube a permeate-side fluid having been separated from the feed-side fluid by passing through the separation membrane. In the spiral-type separation membrane element, it is possible to apply pressure to the raw water, and therefore, it has been preferably used in that a larger amount of a permeated fluid can be taken out.

In the spiral-type separation membrane element, generally, a net made of a polymer is mainly used as the feed-side channel material in order to form a flow channel for the feed-side fluid. In addition, a multilayer-type separation membrane is used as the separation membrane. The multilayer-type separation membrane is a separation membrane provided with a separation functional layer formed of a crosslinked polymer such as polyamide, a porous resin layer (porous supporting layer) formed of a polymer such as polysulfone, and a nonwoven fabric substrate made of a polymer such as polyethylene terephthalate, which are stacked from a feed side to a permeate side. Also, as the permeate-side channel material, a knitted fabric member referred to as tricot, which is finer in mesh than the feed-side channel material, has been used for the purposes of preventing the separation membrane from sinking and of forming a permeate-side flow channel.

In recent years, from increased demands for reduction in cost of fresh water production, membrane elements having higher performance have been required. For example, in order to improve separation performance of the separation membrane elements and to increase the permeated fluid amount per unit time, improvements in performance of separation membrane element members such as channel materials have been proposed.

Specifically, Patent Document 1 proposes a separation membrane element having as a permeate-side channel material a sheet embossed with an uneven pattern. Patent Document 2 proposes a separation membrane element requiring neither a feed-side channel material such as a net nor a permeate-side channel material such as tricot by arranging a channel material formed of an elastomer called a vane on a separation membrane. Further, Patent Document 3 proposes a separation membrane element having a channel material with yarns arranged on a nonwoven fabric.

PATENT DOCUMENT

Patent Document 1: JP-A-2006-247453
Patent Document 2: JP-A-2012-518538
Patent Document 3: US 2012/0261333

SUMMARY OF THE INVENTION

However, the above-mentioned separation membrane elements cannot be said to be sufficient in separation performance, especially in stability performance when they are operated over a long period of time.

Therefore, an object of the present invention is to provide a separation membrane element which can stabilize separation removal performance, especially when the separation membrane element is operated under high pressure.

In order to achieve the above object, according to an aspect of the present invention, a separation membrane element including: a separation membranes each having a feed-side face and a permeate-side face and forming a separation membrane pair by being arranged so that the permeate-side faces face each other; and a permeate-side channel material provided between the permeate-side faces of the separation membranes, in which the permeate-side channel material is provided with a sheet and a plurality of projections formed on the sheet, the sheet is a porous sheet having pores on a surface thereof, and has densely fused parts, coarsely fused parts and non-fused parts on the surface, and the projections contain a resin, and a part of the resin is impregnated into the pores of the sheet is provided.

In addition, according to a preferred embodiment of the present invention, the separation membrane element in which the sheet has a dense fusion part ratio on the surface thereof of 5% to 50% is provided.

In addition, according to a preferred embodiment of the present invention, the separation membrane element in which the densely fused parts have a surface pore ratio of 15% to 70% is provided.

In addition, according to a preferred embodiment of the present invention, the separation membrane element in which, among the pores present per 100 mm² of the sheet surface, the number of pores having a pore size of 150 μm to 200 μm is 30 or more is provided.

In addition, according to a preferred embodiment of the present invention, the separation membrane element in which the sheet surface has a face arithmetic average height of 3 μm to 10 μm is provided.

In addition, according to a preferred embodiment of the present invention, the separation membrane element in which the densely fused parts on the sheet surface constitute a pattern is provided.

According to the present invention, it is possible to form a high-efficiency, stable permeate-side flow channel, whereby a high-performance, high-efficiency separation membrane element having performance of removing separated ingredients and high permeation performance can be obtained.

DETAILED DESCRIPTION OF EMBODIMENTS OF THE INVENTION

Some embodiments of the present invention are described in detail below.

In this specification, "mass" shall be considered to mean "weight".

Figure 1:
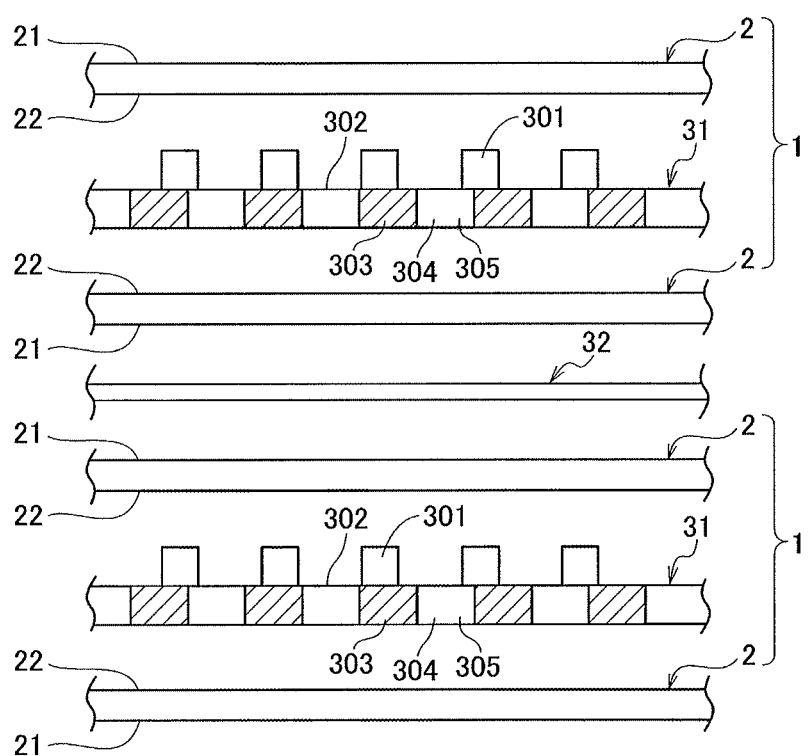
FIG. 1 is a schematic diagram for illustrating a configuration of a separation membrane and a permeate-side channel material in a separation membrane element of an embodiment of the present invention.

As shown in FIG. 1, the separation membrane element of an embodiment of the present invention includes separation membranes 2 each having a feed-side face 21 and a permeate-side face 22 and forming a separation membrane pair 1 by being arranged so that the permeate-side faces 22 face each other, and a permeate-side channel material 31 provided between the permeate-side faces 22 of the separation membranes 2. The permeate-side channel material 31 includes a sheet 302 and a plurality of projections 301 formed on the sheet 302. The sheet 302 is a porous sheet having pores on a surface thereof, and has densely fused parts 303, coarsely fused parts 304 and non-fused parts 305 at least on the surface thereof. The projections 301 contain a resin, and a part of the resin is impregnated into the pores of the sheet.

[1. Separation Membrane]

(1-1) Outline of Separation Membrane

The separation membrane is a membrane which makes it possible to separate ingredients contained in a fluid fed to a surface of the separation membrane and to obtain a permeated fluid which has permeated the separation membrane. The separation membrane can also include one which is embossed and one in which a resin or the like is arranged, so as to form a flow channel. On the other hand, the separation membrane may be one that cannot form a flow channel but expresses only a separation function.

Figure 2:
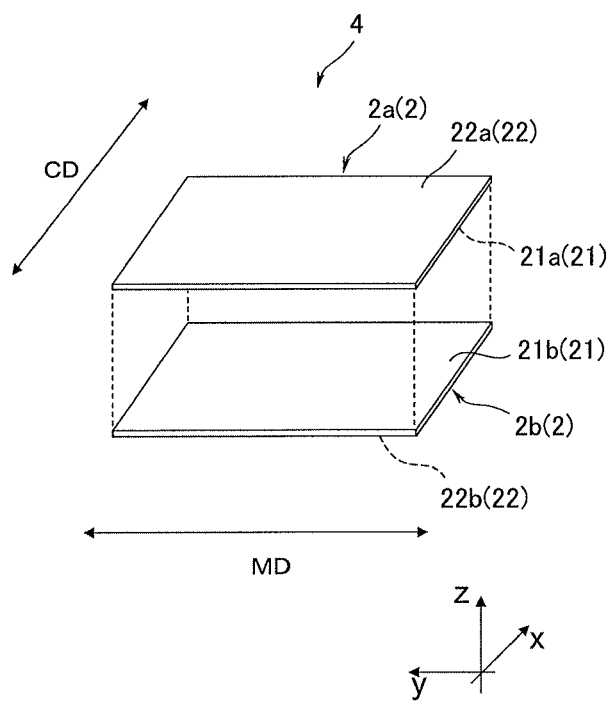
FIG. 2 is a schematic diagram showing one embodiment of a membrane leaf.

As an example of such a separation membrane, FIG. 2 shows a schematic diagram of a membrane leaf including one example of an embodiment of the separation membrane of the present invention. The membrane leaf 4 (sometimes simply referred to as the "leaf") includes a plurality of separation membranes 2 (2a and 2b). The separation membrane 2a has a feed-side face 21a and a permeate-side face 22a, and the separation membrane 2b has a feed-side face 21b and a permeate-side face 22b. The two separation membranes 2a and 2b stacked on each other are arranged so that the feed-side face 21a of one separation membrane 2a and the feed-side face 21b of the other separation membrane 2b face each other with a feed-side channel material (not shown) sandwiched therebetween. In the membrane leaf 4, a feed-side flow channel is formed between the feed-side faces of the separation membranes facing each other. The membrane leaf 4 may be configured either by stacking the plurality of separation membranes 2 or by bending one separation membrane so that the feed-side faces 21 thereof face each other.

Additionally, although not shown, another separation membrane further stacked on the separation membranes 2a and 2b is arranged so that a permeate-side face of the separation membrane faces the permeate-side face 22a or 22b of the separation membrane 2a or 2b.

Figure 3:
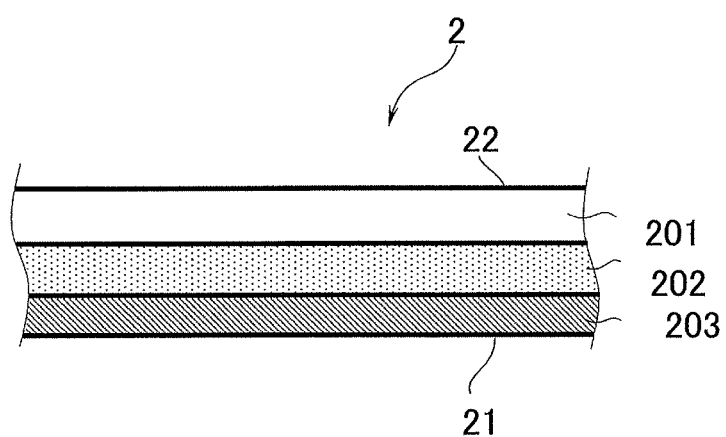
FIG. 3 is a cross-sectional view showing an outline configuration of a separation membrane.

In this description, the term "feed-side face" of the separation membrane means a surface on the side to which raw water is fed, of the two faces of the separation membrane. The term "permeate-side face" means a surface on the opposite side thereof from which a permeated fluid having passed through the separation membrane is discharged out. As described later, in the case where the separation membrane 2 includes a substrate 201, a porous supporting layer 202 and a separation functional layer 203 as shown in FIG. 3, in general, a face on the side of the separation functional layer 203 is the feed-side face 21 and a face on the side of the substrate 201 is the permeate-side face 22.

Further, in FIG. 2 and FIG. 5 to FIG. 9, directional axes of x-axis, y-axis and z-axis are shown. The x-axis may be referred to as a first direction, and the y-axis may be as a second direction. As shown in FIG. 2, the separation membrane 2 is rectangular in shape, and the first direction and the second direction are parallel to an outer edge of the separation membrane 2. The first direction may be referred to as a widthwise direction, and the second direction may be as a lengthwise direction. Also, in FIG. 2, the first direction (widthwise direction) is expressed by the arrow of CD, and the second direction (lengthwise direction) is by the arrow of MD.

(1-2) Separation Membrane

<Outline>

As the separation membrane, a membrane having separation performance according to its usage, its purpose and the like is used. The separation membrane may be formed by a single layer, or it may be a composite membrane including a separation functional layer and a substrate. For example, as shown in FIG. 3, the composite membrane may be configured as a stack of the substrate 201, the porous supporting layer 202 and the separation functional layer 203, in which the porous supporting layer 202 is provided between the substrate 201 and the separation functional layer 203.

<Separation Functional Layer>

The thickness of the separation functional layer is preferably from 5 nm to 3,000 nm in view of separation performance and permeation performance, although not limited to specific numerical values. In particular, in a reverse osmosis membrane, a forward osmosis membrane and a nanofiltration membrane, it is preferably from 5 nm to 300 nm.

The thickness of the separation functional layer can be determined in accordance with a usual method for measuring the membrane thickness of a separation membrane. For example, the separation membrane is embedded in a resin and cut, thereby preparing ultrathin slices. The slices obtained are subjected to treatment such as dyeing. Then, they are observed with a transmission electron microscope, thereby being capable of measuring the thickness. On the other hand, when the separation functional layer has a pleated structure, the thickness of pleats is measured by cross-section observation of 20 pleats located above the porous supporting layer, and the thickness thereof can be determined from the average thereof.

The separation functional layer may be a layer having both a separation function and a support function, or it may be a layer having a separation function alone. The term "separation functional layer" refers to a layer having at least a separation function.

When the separation functional layer has both a separation function and a support function, a layer containing cellulose, polyvinylidene fluoride, polyether sulfone or polysulfone as a main component is preferably applied to the separation functional layer.

In this description, the term "X contains Y as a main component" means that the content of Y in X is usually 50% by mass or more, preferably 70% by mass or more, more preferably 80% by mass or more, still more preferably 90% by mass or more, and particularly preferably 95% by mass or more. In addition, when two or more components corresponding to Y are present, it is only required that the total content of those components satisfies the above-mentioned ranges.

On the other hand, as the separation functional layer supported by the porous supporting layer, a crosslinked polymer is preferably used in terms of easy pore size control and excellent durability. In particular, in terms of excellent performance for separating components in the raw water, a polyamide separation functional layer obtained by polycondensation of a polyfunctional amine and a polyfunctional acid halide, an organic-inorganic hybrid functional layer or the like is favorably used. These separation functional layers can be formed by polycondensation of monomers on the porous supporting layer.

For example, the separation functional layer may contain a polyamide as a main component. Such a membrane may be formed by interfacial polycondensation of a polyfunctional amine and a polyfunctional acid halide according to a known method. For example, an aqueous solution of the polyfunctional amine is applied onto the porous supporting layer, the excessive aqueous amine solution is removed with an air knife, and thereafter an organic solvent solution containing the polyfunctional acid halide is applied thereon to obtain the polyamide separation functional layer.

In addition, the separation functional layer may have an organic-inorganic hybrid structure containing a Si element or the like. The separation functional layer having an organic-inorganic hybrid structure can contain, for example, the following compounds (A) and (B):

(A) a silicon compound in which a reactive group having an ethylenic unsaturated group and a hydrolysable group are directly bonded to a silicon atom, and (B) an ethylenic unsaturated group-containing compound other than the above-mentioned compound (A).

Specifically, the separation functional layer may contain a condensate of the hydrolysable group in the compound (A) and polymers of the ethylenic unsaturated groups in the compound (A) and/or the compound (B). That is, the separation functional layer may contain at least one polymer of a polymer formed by condensation and/or polymerization of the compound (A) alone, a polymer formed by polymerization of the compound (B) alone, and a copolymer of the compound (A) and the compound (B).

The condensate is included in the polymer. Also, the compound (A) may be condensed through the hydrolysable group in the copolymer of the compound (A) and the compound (B).

The organic-inorganic hybrid structure can be formed by publicly known methods. One example of hybrid structure-forming methods is as follows. A reaction solution containing the compound (A) and the compound (B) is applied to the porous supporting layer. An excess of the reaction solution is removed, and then, in order to condense the hydrolysable groups, it is only required to perform heat treatment. As a method for polymerizing the ethylenic unsaturated groups in the compound (A) and the compound (B), it is only required to perform heat treatment, electromagnetic-wave irradiation, electron-beam irradiation or plasma irradiation. For the purpose of increasing the polymerization speed, a polymerization initiator, a polymerization accelerator and the like can be added at the time of forming the separation functional layer.

For any one of the separation functional layers, a membrane surface thereof may be hydrophilized, for example, with an alcohol-containing aqueous solution or an alkaline aqueous solution, before use thereof.

<Porous Supporting Layer>

The porous supporting layer is a layer which supports the separation functional layer, and can also be restated as a porous resin layer.

The material used in the porous supporting layer and the shape thereof are not particularly limited. For example, the porous supporting layer may be formed with a porous resin on the substrate. As the porous supporting layer, polysulfone, cellulose acetate, polyvinyl chloride, epoxy resin, or a mixture or a laminate thereof is used. Among them, it is preferred to use polysulfone having high chemical, mechanical and thermal stability and easily controllable in pore size.

The porous supporting layer imparts mechanical strength to the separation membrane, and unlike the separation membrane, it has no separation function for ingredients having small molecular sizes, such as ions. Although the pore size and pore distribution of the porous supporting layer are not particularly limited, for example, the porous supporting layer may have uniform fine pores, or may have such a size distribution that pores gradually increase in size from a surface on a side where the separation functional layer is formed to the other face (substrate side).

In either case, the projected area circle-equivalent diameter of the fine pores present on the surface on the side where the separation functional layer is formed, which is measured using an atomic force microscope or an electron microscope, is preferably 1 nm to 100 nm. In particular, in terms of interfacial polymerization reactivity and retention of the separation functional layer, it is preferred that the pores present on the surface on the side where the separation functional layer is formed in the porous supporting layer have a projected area circle-equivalent diameter of 3 nm to 50 nm.

Although the thickness of the porous supporting layer is not particularly limited, it is preferably within a range of 20 μm to 500 μm, and more preferably from 30 μm to 300 μm, for such a reason that the strength should be imparted to the separation membrane.

The configuration of the porous supporting layer can be observed with a scanning electron microscope, a transmission electron microscope or an atomic force microscope. For example, when observed with the scanning electron microscope, a sample for cross-section observation is made by peeling off the porous supporting layer from the substrate, and thereafter, cutting this layer in accordance with a freeze fracture method. This sample is thinly coated with platinum, platinum-palladium or ruthenium tetrachloride, preferably ruthenium tetrachloride, and observed with an ultrahigh-resolution field-emission scanning electron microscope (UHR-FE-SEM) under an acceleration voltage of 3 kV to 6 kV. As the ultrahigh-resolution field-emission scanning electron microscope, there can be used an S-900 type electron microscope manufactured by Hitachi Ltd., or the like. On the basis of electron micrographs obtained, the thickness of the porous supporting layer and the projected area circle-equivalent diameter on the surface can be measured.

The thickness and the pore size of the porous supporting layer are average values, and the thickness of the porous supporting layer is an average value of thicknesses measured at 20 points at intervals of 20 μm in a direction orthogonal to a thickness direction by cross-section observation. In addition, the pore size is an average value of projected area circle-equivalent diameters measured on 200 pores.

A method for forming the porous supporting layer is described below. The porous supporting layer can be formed, for example, by casting a N,N-dimethylformamide (hereinafter described as DMF) solution of polysulfone in a constant thickness onto a substrate described later, such as a densely woven polyester fabric or a nonwoven fabric, and subjecting it to wet coagulation in water.

The porous supporting layer can be formed in accordance with the method described in "Office of Saline Water Research and Development Progress Report", No. 359 (1968). In order to obtain a desired configuration, the polymer concentration, the solvent temperature and the poor solvent are adjustable.

For example, the polysulfone resin solution having a predetermined concentration is prepared by dissolving a predetermined amount of polysulfone in DMF. Then, the polysulfone resin solution is applied to the substrate formed of the polyester fabric or the nonwoven fabric to an approximately constant thickness, followed by removing the solvent on the surface in the air for a certain period of time, and thereafter, the polysulfone is coagulated in a coagulating solution. Thus, the porous supporting layer can be obtained.

<Substrate>

The separation membrane may have the substrate from the viewpoints of the strength and dimensional stability of the separation membrane. As the substrate, a fibrous substrate is preferably used in terms of strength, ability to form unevenness and fluid permeability.

Both a long-fiber nonwoven fabric and a short-fiber nonwoven fabric can be preferably used as the fibrous substrate. In particular, the long-fiber nonwoven fabric has an excellent membrane-forming property, and therefore, can suppress that when the high molecular weight polymer solution is flow-cast onto the fabric, the solution may permeate to a backside of the fabric by overpermeation thereof, that when the separation membrane is provided with the porous supporting layer, the porous supporting layer may peel off, that the membrane becomes uneven due to fluffing of the substrate or the like, that defects such as pinholes are generated, and the like. In addition, the substrate is formed of the long-fiber nonwoven fabric composed of thermoplastic continuous filaments, so that it can suppress the occurrence of unevenness of the membrane and membrane defects caused by fluffing of fibers at the time of flow-cast of the polymer solution, as compared with the short-fiber nonwoven fabric. Further, it is preferred to use the long-fiber nonwoven fabric excellent in dimensional stability, because when the separation membrane is continuously formed, tension is applied to a membrane-forming direction.

In terms of formability and strength, it is preferred that, in the long-fiber nonwoven fabric, fibers in a surface layer on a side opposite to the porous supporting layer are more longitudinally oriented than fibers in a surface layer on a side of the porous supporting layer. Such a configuration is preferred, because not only a high effect of preventing membrane failure and the like is realized by retaining the strength, but also the formability as the laminate including the porous supporting layer and the substrate at the time of imparting unevenness to the separation membrane is improved, thereby stabilizing an uneven surface profile of the separation membrane.

More specifically, the degree of fiber orientation in the surface layer of the long-fiber nonwoven fabric on the side opposite to the porous supporting layer is preferably from 0° to 25°. In addition, the difference in the degree of orientation from the degree of fiber orientation in the surface layer on the side of the porous supporting layer is preferably from 10° to 90°.

In a production process of the separation membrane or a production process of the separation membrane element, a heating step is included. A phenomenon may occur in which the porous supporting layer or the separation functional layer shrinks by heating. In particular, the shrinkage is remarkable in a widthwise direction to which no tension is applied in continuous membrane formation. The shrinkage causes a problem in dimensional stability and the like, and therefore, one having a small ratio of dimensional change by heat is desired as the substrate. In the substrate, the difference between the degree of fiber orientation in the surface layer on the side opposite to the porous supporting layer and the degree of fiber orientation in the surface layer on the side of the porous supporting layer is preferably from 10° to 90°, since changes in the widthwise direction due to heat can also be suppressed.

The degree of fiber orientation used herein is an index for indicating the direction of fibers in the substrate to which the porous supporting layer is fixed. Specifically, the degree of fiber orientation is an average value of angles between the membrane-forming direction at the time when continuous membrane formation is performed, that is, a longitudinal direction of the substrate, and a longitudinal direction of the fibers constituting the substrate. That is, when the longitudinal direction of the fibers is parallel to the membrane-forming direction, the degree of fiber orientation is 0°. On the other hand, when the longitudinal direction of the fibers is orthogonal to the membrane-forming direction, or parallel to a widthwise direction of the substrate, the degree of fiber orientation is 90°. Thus, the degree of fiber orientation nearer to 0° indicates to be more longitudinal orientation, and the degree of fiber orientation nearer to 90° indicates to be more lateral orientation.

The degree of fiber orientation is measured in the following manner. First, 10 small piece samples are randomly taken from the substrate. Then, photographs of surfaces of the samples are taken with a scanning electron microscope at a magnification of 100 to 1,000 times. In the photographed images, 10 fibers per sample are chosen, and the angle in the longitudinal direction of the fibers at the time when the angle in the longitudinal direction of the substrate is taken as 0° is measured. Herein, the longitudinal direction of the substrate indicates the "machine direction" in the production of the substrate. Also, the longitudinal direction of the substrate corresponds to the membrane-forming direction of the porous supporting layer and the MD direction in FIG. 2 and FIG. 8. The CD direction in FIG. 2 and FIG. 8 corresponds to the "cross direction" in the production of the substrate.

Thus, the angle is measured on 100 fibers per sheet of the nonwoven fabric. The average value is calculated from the angles in the longitudinal direction thus measured on the 100 fibers. The value obtained by rounding off the calculated average value to the first decimal place is the degree of fiber orientation.

It is preferred to select the thickness of the substrate so that the total of the thickness of the substrate and the thickness of the porous supporting layer falls within a range of 30 μm to 300 μm or within a range of 50 μm to 250 μm.

(1-3) Permeate-Side Channel Material
<Outline>

The permeate-side channel material of an embodiment of the present invention includes the sheet and the projections. The sheet is the porous sheet having the pores on the surface thereof (hereinafter also referred to as the "surface pores"). The presence of the pores on the surface of the sheet makes the projections to be rigidly fixed to the sheet, and the projections is less likely to be peeled off in a step of cutting the permeate-side channel material in the production of the separation membrane element. Therefore, the production process can be stabilized.

As described later, the sheet has densely fused parts, coarsely fused parts and non-fused parts on the surface thereof, and the projections are formed on the sheet surface.

Figure 4:
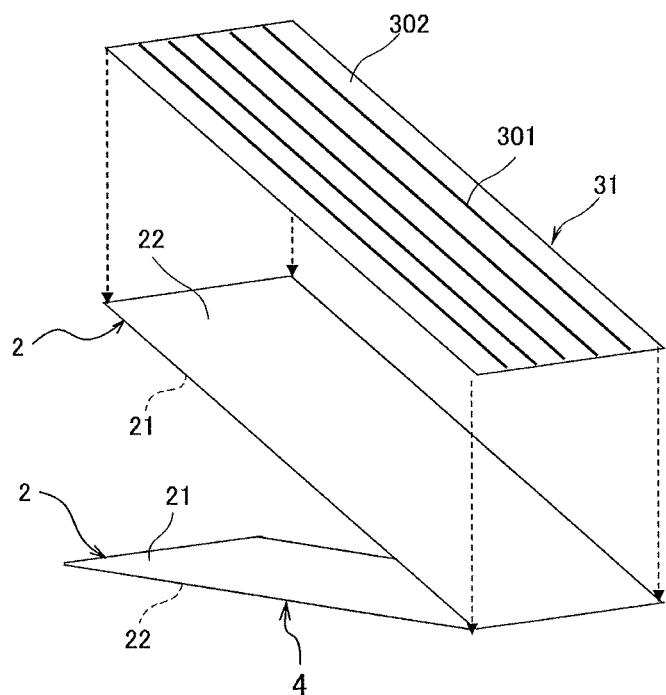
FIG. 4 is a view showing one example of a method for arranging a permeate-side channel material on a membrane leaf.

Additionally, the permeate-side channel material 31 is arranged on the permeate-side face 22 of the separation membrane 2 in the membrane leaf 4 constituted by stacking the plurality of separation membranes 2. In FIG. 4, the membrane leaf 4 is formed by bending one separation membrane 2 so that the feed-side faces 21 thereof face each other, and the permeate-side channel material 31 is arranged on the side of the permeate-side face 22. In this case, it is optional whether the projections 301 of the permeate-side channel material 31 come into contact with the permeate-side face 22 of the separation membrane 2, or the sheet 302 of the permeate-side channel material 31 comes into contact with the permeate-side face 22 of the separation membrane 2. In other words, when the membrane leaf 4 is wound up or when the membrane leaves 4 are stacked, the separation membranes are arranged so that the permeate-side faces face each other. Therefore, the projections come into contact with the permeate-side face of one separation membrane, and the sheet comes into contact with the permeate-side face of the other separation membrane, eventually resulting in the same state. The details of the configuration of the permeate-side channel material are as follows.

<Permeate-Side Channel Material>

In the separation membrane element of the present invention, the sheet 302 constituting the permeate-side channel material 31 is preferably arranged so that the second direction (lengthwise direction) corresponds to the winding direction as shown in FIG. 4. That is, in the separation membrane elements of FIG. 10 to FIG. 12 described later, the sheet 302 is preferably arranged so that the first direction (widthwise direction of the separation membrane) is parallel to a longitudinal direction of a water collection tube 6 and so that the second direction (lengthwise direction of the separation membrane) is orthogonal to the longitudinal direction of the water collection tube 6.

Also, the sheet 302 constituting the permeate-side channel material 31 is present in a region where the permeate-side faces of the separation membranes are adhered to each other. That is, the two separation membranes are adhered with the sheet constituting the permeate-side channel material sandwiched therebetween, and it is preferred that the sheet is present between the separation membranes in at least a part of the adhered portion. In FIG. 4, the size of the sheet 302 constituting the permeate-side channel material is approximately equal to the size of the separation membrane. However, actually, the sheet may be larger in size, or the separation membrane may be larger in size. When the separation membrane is larger in size, spreading of an adhesive can be suppressed, because the sheet serves as a wall.

(Sheet)

As described above, the sheet used in an embodiment of the present invention is the porous sheet, has voids and has the pores on the surface thereof.

As the sheet, the material thereof is not particularly limited. However, from the viewpoints of impregnation control of the projections and handleability, it is preferred to use the sheet formed of a nonwoven fabric.

In an embodiment of the present invention, the sheet has the densely fused parts, the coarsely fused parts and the non-fused parts.

Additionally, in the present invention, in order to improve the tensile strength or tear strength of the sheet, the dense fusion ratio on the surface of the sheet is preferably from 5% to 50%. By setting the dense fusion ratio within the above-mentioned range, the pore ratio among fibers of the sheet becomes an amount suitable for fixing (impregnation) of the projections, and shape retainabilty of the sheet is enhanced, which makes it difficult to lose the shape of the sheet during conveyance. In addition, the unit weight can be decreased, so that the pore amount among the fibers of the sheet is increased to cause the projections to be easily impregnated into the sheet.

The dense fusion ratio is, after the projections are fixed to the sheet, on the face of the sheet on the side where the projections are fixed, the ratio of the area occupied by the densely fused parts to the area of parts of the sheet where the projections are not fixed.

The densely fused part is a region where the plurality of fibers are thermally fused, and the size of the densely fused part is different from the fiber diameter of the fibers constituting the sheet. For example, the surface of the sheet is observed with an electron microscope or the like, and the part having a width larger than the average diameter of the fibers constituting the sheet is a fused part. A part having a width of less than 1.8 times the average fiber diameter is the coarsely fused part, and a part having a width of 1.8 times or more the average fiber diameter is the densely fused part. The average fiber diameter means the average value of diameters measured for any 50 fibers constituting the sheet and not fused with another fiber.

In the coarsely fused part, the surface pore ratio which is a ratio of voids among the fibers on the surface when the sheet is viewed from the side where the projections are fixed is preferably from 25% to 60%, in order to improve the tensile strength or tear strength of the sheet.

In particular, for pores present on the surface when the sheet is viewed from the side where the projections are fixed, as the number of pores having a pore size of 150 μm or more is increased, resistance at the time when a molten resin passes through the pores decreases, whereby the impregnation of the molten resin is promoted, which is therefore preferable. Specifically, for the sheet to which the projections are fixed, among the pores present per 100 mm$^2$, the number of pores having a pore size of 150 μm to 200 μm is preferably 30 or more, and particularly preferably 100 or more.

When observed from the top of the surface of the face to which the projections are fixed, the ratio of the minor diameter to the major diameter (referred to as the aspect ratio) in the densely fused part is preferably from 0.1 to 1.0, and more preferably from 0.3 to 0.8, in order to retain uniformity of rigidity of the sheet.

When the projections are peeled off and removed, and thereafter, the region of the sheet where the projections have been fixed is observed, the sheet may become the densely fused part by heat of the molten resin, in the case where the molten resin is applied to the sheet and solidified by cooling. Therefore, calculation can be made in a region where the projections are not fixed, on the face where the projections are fixed. The physical properties of the region where the projections are fixed are equivalent to those of the region where the projections are not fixed.

The non-fused part is a region where the fibers constituting the sheet are not fused. In the non-fused part, the surface pore ratio which is a ratio of voids among the fibers on the surface when the sheet is viewed from the side where the projections are fixed is preferably from 15% to 70%, in order to improve the tensile strength or tear strength of the sheet. When the projections are arranged on a straight line, it is preferred that 20% or more of the area of the projections in contact with the sheet is arranged on the surface pores.

In the present invention, the coarsely fused parts 304 and the non-fused parts 305 may be present together as shown in FIG. 1.

When the width of the densely fused part is excessively wide, the region where the projection cannot impregnate extends. Therefore, the width of the densely fused part is preferably 2 mm or less, and more preferably 1 mm or less. For the same reason, it is preferred that a pitch thereof is appropriately designed within a range of 1 mm to 50 mm. The pitch is the horizontal distance between a gravity center position of a certain densely fused part and a gravity center position of adjacent densely fused part.

In the non-fused parts, impregnation of the resin of the projections proceeds, and in the fused parts, impregnation does not proceed. Therefore, the sheet to which the projections are fixed is divided into a region where the projections are impregnated into the sheet and a region where the projections are not impregnated. Accordingly, in the present invention, when the projections are produced by applying the molten resin to the sheet and solidifying it, these two regions are different in thermal shrinkage behavior from each other. Therefore, deterioration in quality such as curling of the sheet when uniformly impregnated tends to hardly occur.

(Measuring Methods of Dense Fusion Ratio and Surface Pore Ratio)

Examples of measuring methods of the dense fusion ratio and the surface pore ratio in the sheet include a scanning method and a microscope method which are described below.

In the scanning method, first, the permeate-side channel material cut to an arbitrary size is scanned with a digital scanner (for example, CanoScan N676U manufactured by Canon Inc.) for the face to which the projections are fixed, and a digital image obtained is analyzed with an image analyzing software (ImageJ). Subsequently, for the region of the resulting image where the projections are not fixed, calculation is performed as the dense fusion ratio or the surface pore ratio (%)=100×(area of densely fused parts or pores/cut-out area). Additionally, this operation is repeated, and the average value also can be obtained as the dense fusion ratio or the surface pore ratio.

Also, in the microscope method, for example, using a high-precision configuration analysis system "KS-1100" manufactured by KEYENCE CORPORATION, an image is photographed at a magnification of 100 times from the face to which the permeate-side channel material projections are fixed, and the image is made black-and-white by setting numerical values of the texture to zero. Subsequently, the digital image obtained is analyzed with an image analyzing software (ImageJ), and for the region of the resulting image where the projections are not fixed, it is repeated to perform calculation as the dense fusion ratio or the surface pore ratio (%)=100×(area of densely fused parts or pores/cut-out area). Then, this operation is repeated and the average value thereof is obtained as the dense fusion ratio or the surface pore ratio.

(Face Arithmetic Average Height)

The face arithmetic average height refers to the average value of the absolute values of differences in height between respective points and an average face of the surface. From the viewpoint of satisfying both impregnation of the projections in the sheet and uniformity of height, the surface arithmetic average height of the sheet is preferably from 3 μm to 10 μm. When the surface arithmetic average height of the sheet is less than 3 μm, impregnation of the resin contained in the projections into the sheet does not proceed, sometimes resulting in easy peeling, although the height of the projections becomes uniform. In the case of exceeding 10 μm, when the projections are arranged on the sheet, the shape of the projections is easily lost, and the height thereof tends to become non-uniform, although the impregnation of the resin contained in the projections into the sheet is improved.

Such a face arithmetic average height is controllable by changing the unit weight, compression bonding conditions and the thickness of the fibers, for example, when the sheet is the nonwoven fabric.

For example, the face arithmetic average height tends to decrease as the roll temperature and press pressure during compression bonding increase.

In addition, the face arithmetic average height can be evaluated according to the method described in ISO 25178, and for example, an atomic force microscope, a laser microscope or a noncontact three-dimensional measuring device can be used. As the noncontact three-dimensional measuring device, for example, a one-shot 3D measuring macroscope manufactured by KEYENCE CORPORATION can be preferably used, because measurement can be performed easily with high accuracy while suppressing fluctuation in the results depending on a measuring point or a scanning direction.

For the permeate-side channel material, the face arithmetic average height can be measured about the face opposite to the face to which the projections are not fixed.

(Pattern of Densely Fused Parts)

When the densely fused parts are regularly present on the surface of the sheet, unevenness in rigidity of the sheet is decreased, and wrinkles, breakage or the like during conveyance can be suppressed. When the plurality of densely fused parts provided on the sheet form a design and there are regions similarly arranged in the MD direction, the design formed by the plurality of densely fused parts may also be called a "pattern". When there are densely fused parts regularly present along the MD direction, fluctuation in rigidity of the sheet to which the projections are fixed is decreased, so that a winding property of the separation membrane element is improved. This is therefore preferred. In particular, a lattice shape, a zigzag shape or a combination thereof is more preferred.

The shape of the pattern of the densely fused parts is not particularly limited. Examples of the shapes observed from the top of the surface of the face to which the projections are fixed include oval, circular, ellipsoidal, trapezoidal, triangular, rectangular, square, parallelogrammic, and diamond-shaped.

(Fusing Method)

As a method for fusing the sheet, a conventionally known method such as laser irradiation, hot roll treatment or calendering can be employed. When fused by a hot roll, embossing is preferred in that the densely fused parts can be stably formed during production.

In the embossing, the sheet is subjected to hot press treatment using an embossing roll, and usually, the sheet is pressed by two rolls, a roll having a smooth surface and a hot roll having an embossed pattern. The line pressure at the time of pressing is preferably from 1 kg/cm to 50 kg/cm. When the line pressure is too low, sufficient strength cannot be imparted. When the line pressure is too high, the fibers constituting the sheet are formed into a film, and the projections tend to be hardly impregnated into the nonwoven fabric.

The embossing may be performed on either one face or both faces of the sheet. When the embossing is performed on one face, the dense fusion ratio of the face having the height difference tends to be lower than that of the other face. This is therefore suitable in terms of allowing the projections to be impregnated. When the embossing is performed on both faces, the rigidity of the sheet is more increased because the densely fused parts are present symmetrically in the thickness direction. This is therefore excellent in terms of stable conveyance.

(Height Difference of Sheet by Embossing)

When the height difference is imparted to the sheet by the embossing, it can be freely controlled by varying the pressure heat treatment conditions so that separation characteristics and water permeation performance of the separation membrane element satisfy the required conditions. However, when the height difference is too large, the number of membrane leaves capable of being loaded in a vessel decreases when being made into the element. As a result, the fresh water production performance of the element is lowered, and the operation cost for increasing the fresh water production rate is increased.

Accordingly, in consideration of the balance of the above-mentioned respective performance and the operation cost, in the separation membrane, the height difference of the densely fused parts on the feed-side face of the separation membrane is preferably 0.1 mm or less, and more preferably 0.07 mm or less.

Such a height difference can be determined, for example, by analyzing the average height difference using a membrane thickness measuring instrument (KG601A manufactured by Anritsu Corporation), measuring 30 points having a height difference of 5 μm or more, and dividing the total sum of the respective height values by the total number of the measurement points.

(Thickness of Sheet Constituting Permeate-Side Channel Material)

The thickness of the sheet constituting the permeate-side channel material is preferably 0.2 mm or less. Because it is preferred that the sheet is impregnated with an adhesive, in order to seal between the permeate-side faces of the separation membranes stacked. In addition, the thinner the sheet is made, the higher the projections (later described) become, and the flow resistance as the permeate-side channel material is decreased, thereby tending to improve element performance.

(Porosity of Sheet Constituting Permeate-Side Channel Material)

The porosity of the sheet constituting the permeate-side channel material is preferably from 20% to 90%, and particularly preferably from 45% to 80%. The porosity as used herein means the ratio of voids per unit volume of the sheet, and can be obtained by dividing a value obtained by subtracting the weight of the dry sheet from the weight of the sheet having a predetermined apparent volume in which water is allowed to be contained, by the apparent volume, and expressing the resulting value in percentage (%).

When the porosity of the sheet is from 20% to 90%, the projections 301 can be impregnated therein and fixed thereto, and further, in the sheet, voids through which water can be permeated are easily secured.

<Constituent Component of Projections>

Although a component constituting the projections is not limited to a specific material, a resin is preferably used. Specifically, in terms of chemical resistance, an ethylene-vinyl acetate copolymer resin, a polyolefin such as polyethylene or polypropylene, a polyolefin copolymer or the like is preferred. In addition, as a material for the permeate-side channel material, a polymer may also be selected such as a urethane resin, an epoxy resin, a polyether sulfone, polyacrylonitrile, polyvinyl chloride, polyvinylidene chloride, polyvinyl alcohol, an ethylene-vinyl alcohol copolymer, polystyrene, a styrene-acrylonitrile copolymer, a styrene-butadiene-acrylonitrile copolymer, a polyacetal, polymethyl methacrylate, a methacryl-styrene copolymer, cellulose acetate, a polycarbonate, polyethylene terephthalate, polybutadiene terephthalate or a fluororesin (such as ethylene trifluoride chloride, polyvinylidene fluoride, ethylene tetrafluoride, an ethylene tetrafluoride-propylene hexafluoride copolymer, an ethylene tetrafluoride-perfluoroalkoxyethylene copolymer or an ethylene tetrafluoride-ethylene copolymer). These materials are used alone or as a mixture of two or more thereof. In particular, a thermoplastic resin is easily molded, and can therefore form the permeate-side channel material having a uniform shape. The sheet and the projections may be formed of the same material or different materials.

<<Projections Constituted of Polypropylene>>

In addition, when the projections have the following configuration, a balance between pressure resistance and flexibility can be satisfied, and operation stability can be improved. That is, the projections may contain highly crystalline polypropylene, and may satisfy the following requirements (a) and (b):

(a) The content of the highly crystalline polypropylene is from 20 to 95% by mass in the composition constituting the projections.

(b) The melt endothermic amount ($\Delta H$) of the above-mentioned projections is from 20 J/g to 70 J/g.

In this case, when the content of the highly crystalline polypropylene is 95% by mass or less in the composition constituting the projections, curl of the permeate-side channel material in which the projections are formed on the sheet can be suppressed. Handleability of the permeate-side channel material is thus improved, and for example, passability in a step of stacking the pair of separation membranes, which is one of the steps of producing the separation membrane element, is remarkably improved. The content of the highly crystalline polypropylene is preferably 85% by mass or less, and more preferably 75% by mass or less.

On the other hand, when the content of the highly crystalline polypropylene is 20% by mass or more in the composition constituting the projections, not only the curl of the sheet is suppressed, but also compressive deformation of the projections can be suppressed, for example, even when the separation membrane element of the present invention is operated under pressurized conditions exceeding 2 MPa. As a result, deterioration of separation membrane element performance (particularly fresh water production performance) can be suppressed, and stable performance can be exhibited. In terms of suppressing the compressive deformation amount, the content of the highly crystalline polypropylene is preferably 45% by mass or more, and more preferably 50% by mass or more.

Examples of the highly crystalline polypropylene include a propylene homopolymer, a propylene random copolymer, and a propylene block copolymer. These may be used alone or as a mixture of two or more thereof. Also, the melting point of the highly crystalline polypropylene is preferably 140° C. or higher, and more preferably 150° C. or higher. The melting point is a value measured with a differential scanning calorimeter (DSC). The melting point can be measured, for example, by subjecting a sample to measurement under conditions of a penetration probe as a probe, a measuring load of 10 g and a rate of temperature increase of 5° C./min, using a thermal analysis instrument such as a thermal mechanical analyzer TMA/SS-6000 manufactured by Seiko Instruments Inc.

Further, the melt flow rate (MFR) of the highly crystalline polypropylene is preferably from 10 g/10 min to 2,000 g/10 min. When the MFR is within such a range, melt forming of the permeate-side channel material becomes easy. In addition, it becomes possible to set the melt forming temperature low. As a result, damage of the separation membrane caused by heat or deterioration in the separation membrane performance during melt forming can be suppressed. Furthermore, fixability to the permeate-side face of the separation membrane is improved. The MFR of the highly crystalline polypropylene is more preferably from 30 g/10 min to 1,800 g/10 min, and still more preferably from 50 g/10 min to 1,500 g/10 min. The MFR is a value measured under conditions of 230° C. and a load of 2.16 kg, in accordance with JIS-K7200 (1999).

The melt endothermic amount ($\Delta H$) of the projections is preferably from 20 J/g to 70 J/g. When the melt endothermic amount ($\Delta H$) is from 20 J/g to 70 J/g, stickiness of the projections is suppressed while suppressing the curl of the sheet. Therefore, the process passability of the permeate-side channel material is satisfactory.

$\Delta H$ of the projections is more preferably from 25 J/g to 65 J/g, and still more preferably from 30 J/g to 60 J/g. The melt endothermic amount is a value measured with a differential scanning calorimeter (DSC). For example, in measurement in which the temperature of 10 mg of a sample is increased from 20° C. to 220° C. at a rate of temperature increase of 10° C./min, and after retained at 220° C. for 10 minutes, decreased to 20° C. at a rate of temperature decrease of 10° C./min, using a differential scanning calorimeter DSC-7 manufactured by Parkin Elmer Co., the exothermic amount based on crystallization observed when the temperature is decreased can be taken as the melt endothermic amount.

Further, the composition constituting the projections preferably contains a low crystalline $\alpha$-olefinic polymer, and the content thereof is preferably from 5% by mass to 60% by mass in the composition constituting the projections.

The low crystalline $\alpha$-olefinic polymer of an embodiment of the present invention is an amorphous or low crystalline $\alpha$-olefinic polymer, and there can be exemplified low crystalline polypropylene such as atactic polypropylene or isotactic polypropylene having low stereoregularity; a copolymer of ethylene with $\alpha$-olefin which is selected from the group consisting of $\alpha$-olefins having 3 to 20 carbon atoms (the $\alpha$-olefins having 3 to 20 carbon atoms include straight-chain and branched $\alpha$-olefins, specifically, examples of the straight-chain $\alpha$-olefins include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene, and examples of the branched $\alpha$-olefins include 3-methyl-1-butene, 3-methyl-1-pentene, 4-methyl-1-pentene, 2-ethyl-1-hexene, and 2,2,4-trimethyl-1-pentene); a commercially available propylene-olefin copolymer such as "Tafmer" manufactured by Mitsui Chemicals, Inc. or "Tafcelene" manufactured by Sumitomo Chemical Co., Ltd.; or the like. In the present invention, one kind or two or more kinds of these can be used. Above all, the low crystalline polypropylene and the propylene-olefin copolymer are more preferred as the low crystalline $\alpha$-olefinic polymer, from the viewpoints of compatibility with the highly crystalline polypropylene, versatility, an effect of reducing the curl of the sheet and the like.

The content of the low crystalline $\alpha$-olefinic polymer is preferably from 5 to 60% by mass based on the total amount of the composition constituting the projections. When the content of the low crystalline $\alpha$-olefinic polymer is 5% by mass or more, the flexibility can be imparted to the projections, and the crystallization rate of the highly crystalline polypropylene can be retarded. As a result, the curl of the sheet can be suppressed. On the other hand, when the content of the low crystalline α-olefinic polymer exceeds 60% by mass, the flexibility of the projections is extremely increased, although the curl of the sheet is largely reduced. For example, when operated under pressurized conditions exceeding 2 MPa, the compressive deformation amount of the projections is increased. As a result, the separation membrane element performance (particularly the fresh water production performance) may be largely deteriorated by flow channel blockage. In terms of the flexibility of the projections and compressive deformability under pressure, the content of the low crystalline α-olefinic polymer is preferably 10 to 55% by mass, and more preferably from 15 to 50% by mass.

Also, in the present invention, the projections may contain one or two or more kinds of additives such as a thermal flowability improver, a filler, an antioxidant and a lubricant, as far as the object of the present invention is not impaired.

Examples of the thermal flowability improvers include, but are not limited to, synthetic waxes such as polyethylene waxes, polypropylene waxes, atactic polypropylene waxes and Fischer-Tropsch waxes; petroleum waxes such as paraffin waxes and micro waxes; natural waxes such as carnauba waxes and beeswaxes; rosin-based resins such as rosins, hydrogenated rosins, polymerized rosins and rosin esters; terpene-based resins such as terpenes, hydrogenated terpenes, aromatic modified terpenes and aromatic modified hydrogenated terpenes; and hydrogenated petroleum resins such as "IMARV" (trade name) manufactured by ldemitsu Kosan Co., Ltd., "ARKON" (trade name) manufactured by Arakawa Chemical Industries, Ltd. and "Petcoal" and "Petrotack" (both are trade names) manufactured by Tosoh Corporation. These may be used alone or as a mixture of two or more thereof. Of these, in terms of an effect of improving thermal flowability of the composition, the compatibility with the highly crystalline polypropylene and thermal decomposition resistance of the composition when melted by heating, the synthetic waxes, the terpene-based resins and the hydrogenated petroleum resins are preferred. The content thereof can be appropriately set for adjusting the melt viscosity of the composition constituting the projections. However, in consideration of a decrease in pressure resistance of the projections or the occurrence of bleeding out to surfaces of the projections, it is preferably 50% by mass or less, and more preferably 40% by mass or less, in the composition constituting the projections.

Examples of the antioxidants include, but are not limited to, phenolic compounds; phosphorus-based compounds; hindered amine-based compounds; and sulfur-based compounds. These may be used alone or as a mixture of two or more thereof. In terms of suppressing thermal decomposition of the composition during formation of the projections, the content thereof is preferably from 0.001 to 1% by mass based on the composition constituting the projections.

Examples of the lubricants include, but are not limited to, fatty acid amide-based compounds such as stearic acid amide, oleic acid amide, erucic acid amide and ethylene bis-stearic acid amide; metal soaps such as calcium stearate, zinc stearate, and magnesium stearate; and fatty acid ester-based compounds. These may be used alone or as a mixture of two or more thereof.

Examples of the fillers include, but are not limited to, inorganic compounds such as calcium carbonate, talc, alumina, silica, mica and clay. These may be used alone or as a mixture of two or more thereof. In terms of formability of the projections, thickening of the composition and wear of a processing apparatus, the content thereof is preferably from 3 to 30% by mass based on the composition constituting the projections.

In the present invention, the tensile elongation of the projections fixed to the permeate-side face of the separation membrane is preferably 5% or more. In the case where the tensile elongation thereof is 5% or more, even when the separation membrane is conveyed with rolls or wound up with a winder, breakage or destruction of the projections can be suppressed, the separation membrane having high quality can be obtained, and handleability in the element production process is improved. The tensile elongation of the projections is more preferably 7% or more, and still more preferably 10% or more. The higher the tensile elongation is, the higher the energy necessary for destruction becomes. In terms of toughness, therefore, the higher tensile elongation is preferred. However, when the tensile elongation is excessively increased, the deformation amount under constant stress is increased. It is therefore preferably 300% or less, and more preferably 200% or less.

In the present invention, the tensile elastic modulus of the projections is preferably from 0.2 GPa to 2.0 GPa. In the case where the tensile elastic modulus thereof is 0.2 GPa or more, even when the separation membrane element is operated under pressurized conditions exceeding 2.0 MPa, the compressive deformation amount of the projections can be suppressed. As a result, deterioration in the fresh water production performance can be suppressed. The tensile elastic modulus thereof is more preferably 0.25 GPa or more, and still more preferably 0.30 GPa or more. The higher the tensile elastic modulus is, the more the compressive deformation amount of the projections during operation under pressure is suppressed. However, it is substantially difficult to achieve 2.0 GPa or more.

<Shape and Arrangement of Projections>
<<Outline>>

Tricot which has conventionally been widely used is a knitted fabric, and is made up of three-dimensionally crossed yarns. That is, the tricot has a two-dimensionally continuous structure. When such tricot is applied as the permeate-side channel material, the height of the flow channel becomes lower than the thickness of the tricot. In other words, this is a structure that the proportion not forming grooves is large.

Figure 5:
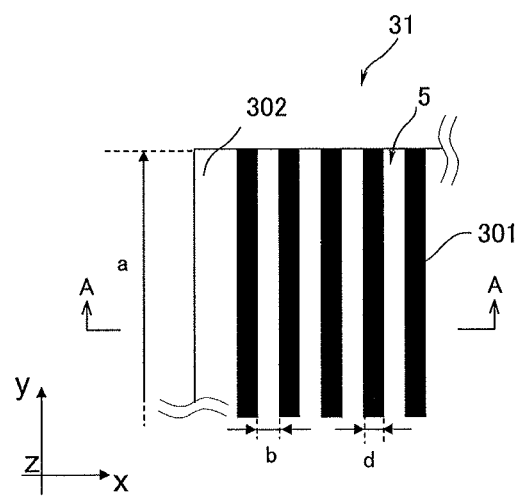
FIG. 5 is a plan view showing a permeate-side channel material having projections continuously provided in a lengthwise direction (a second direction) of a sheet.

In contrast, as an example of the configuration of the present invention, the projections 301 shown in FIG. 5 and the like are arranged on the sheet 302. Accordingly, the height (or the thickness) of the projections 301 is utilized as the depth of the grooves of the flow channels. Therefore, the thinner the sheet is and the higher the projections are, the more widely the flow channels (the grooves between the projections 301 and the surface pores of the sheet 302) are present than the case where the tricot having the same thickness as that of the projections of the present invention is applied. Therefore, the flow resistance tends to become smaller.

Figure 6:
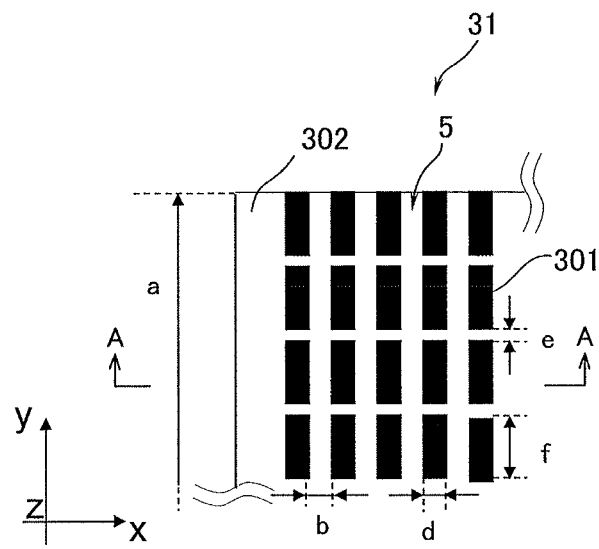
FIG. 6 is a plan view showing a permeate-side channel material having projections discontinuously provided in a lengthwise direction (a second direction) of a sheet.
Figure 7:
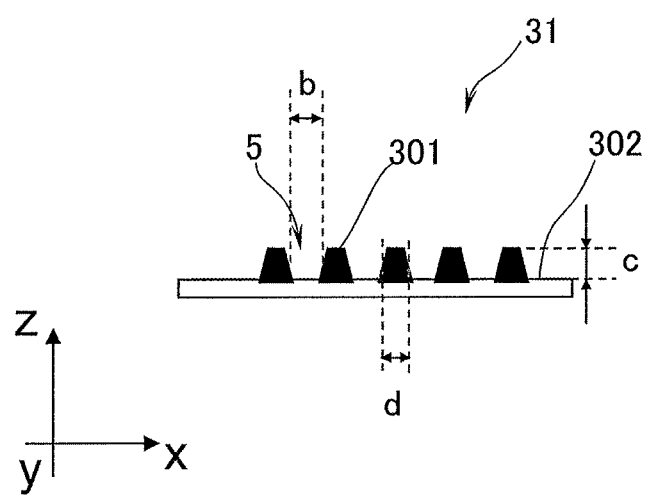
FIG. 7 is a cross-sectional view taken on line A-A of each of the separation membranes of FIG. 5 and FIG. 6.

Additionally, in the configurations shown in FIG. 5 to FIG. 7, a plurality of discontinuous projections 301 are fixed on one sheet 302. The term "discontinuous" is a state in which a plurality of permeate-side channel materials are so provided as to be spaced from each other. Namely, when one projection 301 is peeled from the sheet 302, a plurality of projections 301 separated from each other are obtained. In contrast, a member such as a net, tricot, a film or the like shows a continuous integrated shape even when the flow channel is separated from the sheet 302.

By providing the plurality of discontinuous projections 301 on the sheet 302, the separation membrane 2 can suppress the pressure drop low, when incorporated into a separation membrane element 100 described later. As examples of such a configuration, the projections 301 are discontinuously formed only in the first direction (the widthwise direction of the sheet 302) in FIG. 5, while these are discontinuously formed in both the first direction (the widthwise direction of the sheet 302) and the second direction (the lengthwise direction of the separation membrane) in FIG. 6.

In FIG. 5 and FIG. 6, the permeate-side flow channel 5 is formed in the space between the neighboring projections 301.

Figure 8:
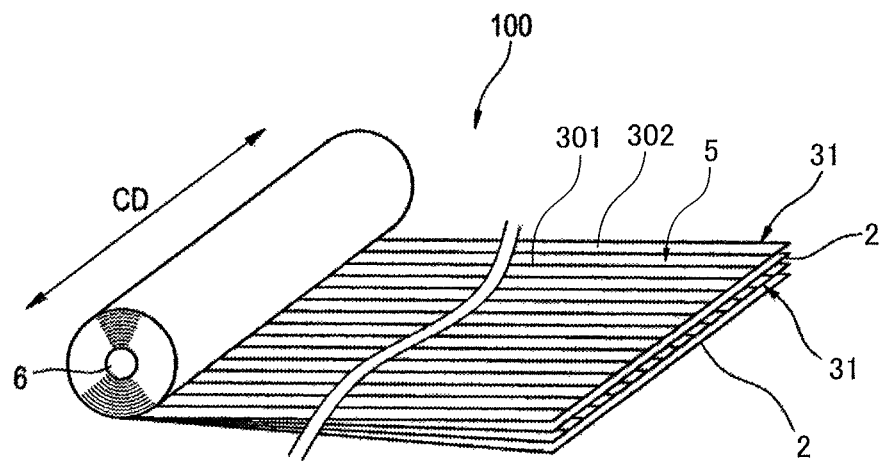
FIG. 8 is a developed perspective view showing one embodiment of a separation membrane element.
Figure 8:
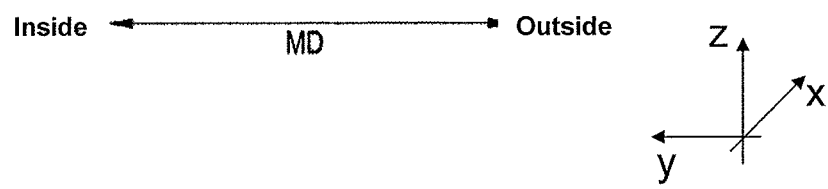

In the configuration shown in FIG. 5, the projections 301 are provided discontinuously in the first direction, and provided continuously from one end to the other end of the sheet 302, in the second direction. Namely, when the permeate-side channel material 31 is incorporated in the separation membrane element as shown in FIG. 8, the projections 301 are so arranged as to be continuous from an inside end of the sheet 302 in the winding direction to an outside end thereof. The inside in the winding direction is a side nearer to the water collection tube 6 in the separation membrane, and the outside in the winding direction is a side distant from the water collection tube 6 in the separation membrane.

The wording the projections "are continuously provided in the second direction" includes both the case where the projections 301 are provided without interruption as in FIG. 5 and the case where the projections 301 are interrupted somewhere but are substantially continuous as in FIG. 6. The "substantially continuous" configuration preferably satisfies that the distance e between the projections 301 in the second direction (namely, the length of an interrupted part in the projections 301) is 5 mm or less, as shown in FIG. 6. In particular, the distance e is more preferably 1 mm or less, and still more preferably 0.5 mm or less. In addition, the total value of the distance e contained from the top to the tail of a line of the projections 301 aligning in the second direction is preferably 100 mm or less, more preferably 30 mm or less, and still more preferably 3 mm or less. In the configuration of FIG. 5, the distance e is 0 (zero).

As shown in FIG. 5, in the case where the projections 301 are provided without interruption in the second direction, membrane sinking during pressure filtration is suppressed. The membrane sinking means that the separation membrane sinks in the flow channel to narrow the flow channel.

In FIG. 6, the projections 301 are provided discontinuously not only in the first direction but also in the second direction. Namely, the projections 301 are provided with intervals in the lengthwise direction. In this connection, as described above, when the projections 301 are substantially continuously provided in the second direction, the membrane sinking is suppressed. However, when the projections 301 are discontinuously provided in the two directions as described above, the contact area between the projections and the fluid is decreased, and therefore the pressure drop is reduced. This configuration may also be said as a configuration where the permeate-side flow channel 5 has branch points. Namely in the configuration of FIG. 6, the permeated fluid is divided by the projections 301 and the sheet 302 while flowing through the permeate-side flow channel 5, and can be combined again in the downstream.

As described above, in FIG. 5, the projections 301 are so provided as to be continuous from one end to the other end of the sheet 302 in the second direction. In FIG. 6, the projections 301 are divided into plural parts in the second direction, and these plural parts are so arranged as to align from one end to the other end of the sheet 302.

The wording the projections "are provided from one end to the other end of the sheet" includes both the configuration where the projections 301 are provided up to the edge of the sheet 302 and the configuration where the projections 301 are not provided in a region near the edge thereof. Namely, the projections 301 may be distributed along the second direction in such a manner that they may form a flow channel on the permeate-side face of the separation membrane, and the sheet 302 may have a region where no projections 301 are provided. For example, in the permeate-side face of the separation membrane, it is unnecessary to provide the projections 301 on a part adhered to the separation membrane (that may be reworded as a contact part). Because of any other reason of specifications or because of reason in production, some part such as the edge or the like of the separation membrane may have no projections 301 arranged therein.

Also in the first direction, the projections 301 may be distributed almost uniformly over the entire region of the sheet 302. However, like the distribution in the second direction, it is unnecessary to provide the projections 301 on a part adhered to the separation membrane in the permeate-side face of the separation membrane. Because of any other reason of specifications or because of reason in production, some part such as the edge or the like of the sheet 302 may have no projections 301 arranged therein.

<<Dimension of Projections>>

In FIG. 5 to FIG. 7, a to f each indicate the following value.

a: Length of the separation membrane b: Distance between the projections 301 in the widthwise direction of the separation membrane c: Height of the projections 301 (the height difference between a highest part of the projections 301 and a face of the sheet to which the projections 301 are fixed)

d: Width of the projections 301 e: Distance between the projections 301 in the lengthwise direction of the separation membrane f: Length of the projections 301

For measurement of values a, b, c, d, e and f, for example, commercially-available shape measuring systems, microscopes or the like may be used. Each value is determined by carrying out the measurement at 30 points or more for one separation membrane, and dividing the total of those values by the total number of the measurement points to calculate the average value. It is only required that the value obtained as a result of the measurement at least 30 points in this manner be satisfy the range described below.

(Length a of Separation Membrane)

The length a is the distance from one end to the other end of the separation membrane 2 in the second direction (the lengthwise direction of the separation membrane). When the distance is not constant, the length a can be obtained by measuring the distance at 30 or more points for one separation membrane 2, and determining the average value thereof.

(Distance b Between Projections in Widthwise Direction of Separation Membrane)

The distance b between the neighboring projections 301 in the first direction (the widthwise direction of the separation membrane) corresponds to the width of the permeate-side flow channel 5. When the width of one permeate-side flow channel 5 is not constant in one cross section, that is, when side faces of the neighboring two projections 301 are not parallel to each other, the average value of the maximum value and the minimum value of the width of one permeate-side flow channel 5 in one cross section is measured, and the average value thereof is calculated. As shown in FIG. 7, when the neighboring two projections 301 in a cross section vertical to the second direction form a trapezoidal shape whose top is thin and bottom is thick, first, the distance between the tops of the neighboring two projections 301 and the distance between the bottoms thereof are measured, and the average value thereof is calculated. In arbitrary 30 or more cross sections, the distance between the neighboring two projections 301 is measured, and the average value is calculated in each cross section. Then, the arithmetic average value of the average values thus obtained is further calculated, thereby calculating the distance b.

The pressure drop is decreased as the distance b increases. However, the membrane sinking occurs more frequently. Conversely, the membrane sinking becomes difficult to occur as the distance b decreases. However, the pressure drop is increased. In consideration of the pressure drop, the distance b is preferably 0.05 mm or more, more preferably 0.2 mm or more, and still more preferably 0.3 mm or more. Also, in terms of suppressing the membrane sinking, the distance b is preferably 5 mm or less, more preferably 3 mm or less, still more preferably 2 mm or less, and particularly preferably 0.8 mm or less.

These upper and lower limits can be arbitrarily combined. For example, the distance b is preferably from 0.05 mm to 5 mm, and within this range, the pressure drop can be decreased while suppressing the membrane sinking. The distance b is more preferably from 0.05 mm to 3 mm, still more preferably from 0.2 mm to 2 mm, and particularly preferably from 0.3 mm to 0.8 mm.

(Height c of Projections)

The height c is the height difference between the projections and the surface of the sheet 302. As shown in FIG. 7, the height c is the difference in height between a highest part of the projections 301 and a face of the sheet 302 to which the projections 301 are fixed, in a cross section vertical to the second direction. Namely, as the height of the projections 301, the thickness of parts impregnated into the sheet 302 is not taken into consideration. The height c is a value obtained by measuring the height for 30 or more projections 301 and averaging the measured value. The height c may be obtained by observation of cross sections of the channel material on the same plane, or by observation of cross sections of the channel materials on a plurality of planes.

The height c is appropriately selected in accordance with the use conditions and purpose of the separation membrane element, and the like. It may also be set as described below.

The higher height c causes the lower flow resistance. Accordingly, the height c is preferably 0.03 mm or more, more preferably 0.05 mm or more, and still more preferably 0.1 mm or more. On the other hand, the lower height c increases the number of the membranes loaded per one separation membrane element. Accordingly, the height c is preferably 0.8 mm or less, more preferably 0.4 mm or less, and still more preferably 0.32 mm or less. These upper and lower limits can be combined. For example, the height c is preferably from 0.03 mm to 0.8 mm (from 30 µm to 800 µm), more preferably from 0.05 mm to 0.4 mm, and still more preferably from 0.1 mm to 0.32 mm.

In addition, it is preferred that the difference in height between the neighboring two projections is small. When the difference in height is large, defects may occur in the separation membrane, because strain is generated in the separation membrane during pressure filtration. The height difference between the neighboring two projections is preferably 0.1 mm or less (100 µm or less), more preferably 0.06 mm or less, and still more preferably 0.04 mm or less.

For the same reasons, the maximum height difference of all the projections 301 provided in the sheet 302 is preferably 0.25 mm or less, more preferably 0.1 mm or less, and still more preferably 0.03 mm or less.

(Width d of Projection)

The width d of the projections 301 is measured as follows. First, in one cross section vertical to the first direction (the widthwise direction of the separation membrane), the average value of the maximum width and the minimum width of one projection 301 is calculated. Namely, in the projection 301 whose top is thin and bottom is thick as shown in FIG. 7, the width of the bottom of the channel material and the width of the top thereof are measured, and the average value thereof is calculated. Such an average value is calculated in at least 30 cross sections, and the arithmetic average thereof is calculated, thereby being able to calculate the width d per membrane.

The width d of the projection 301 is preferably 0.2 mm or more, and more preferably 0.3 mm or more. When the width d is 0.2 mm or more, the shape of the projections can be kept, and the permeate-side channel material can be stably formed, even when pressure is given to the projections 301 and the sheet 302 during operation of the separation membrane element. The width d is preferably 2 mm or less, and more preferably 1.5 mm or less. When the width d is 2 mm or less, the flow channel on the side of the permeate-side face of the separation membrane can be sufficiently secured.

When the width d of the projections 301 is broader than the distance b between the projections 301 in the second direction, pressure to be given to the projections can be dispersed.

The projections 301 are so formed that the length thereof is larger than the width thereof. Such long projections 301 are also called "wall-like structures".

(Distance e Between Projections in Lengthwise Direction of Separation Membrane)

The distance e between the projections 301 in the second direction (the lengthwise direction of the separation membrane) is the shortest distance between the neighboring projections 301 in the second direction (the lengthwise direction of the separation membrane). As shown in FIG. 5, in the case where the projections 301 are continuously arranged from one end to the other end of the separation membrane 2 in the second direction (in the separation membrane element, from the inside end to the outside end in the winding direction), the distance e is 0 mm. Additionally, in the case where the projections 301 are interrupted in the second direction, as shown in FIG. 6, the distance e is preferably 5 mm or less, more preferably 1 mm or less, and still more preferably 0.5 mm or less. When the distance e is within the above-mentioned range, the mechanical load to the membrane is small even when the membrane sinking occurs, so that the pressure drop owing to flow channel clogging can be made relatively small. The lower limit of the distance e is 0 mm.

(Length f of Projections)

The length f of the projections 301 is the length of the projections 301 in the lengthwise direction (namely the second direction) of the separation membrane. The length f is determined by measuring the length of 30 or more projections 301 in one separation membrane and calculating the average value thereof. The length f of the projections 301 is only required to be not more than the length a of the separation membrane. When the length f of the projections 301 is the same as the length a of the separation membrane, it means that the projections 301 are continuously arranged from the inside end to the outside end in the winding direction of the separation membrane. The length f is preferably 10 mm or more, and more preferably 20 mm or more. When the length f is 10 mm or more, the flow channel can be secured even under pressure.

(Shape of Projections)

Although the shape of the projections 301 is not particularly limited, such a shape as to reduce the flow resistance in the flow channel to stabilize the flow channel in permeation can be selected. In these respects, in any cross section vertical to the plane direction of the separation membrane, the shape of the projection 301 may be straight columnar, trapezoidal, curved columnar or a combination thereof.

In the case where the cross-sectional shape of the projection 301 is trapezoidal, when the difference between the upper bottom length and the lower bottom length is too large, the membrane sinking during pressure filtration occurs more frequently in the membrane in contact with the smaller one. For example, when the upper bottom of the channel material is shorter than the lower bottom thereof, the width of an upper part of the flow channel therebetween is broader than the width of a lower part thereof. Therefore, the upper membrane tends to sink downward. Then, in order to suppress such sinking, the ratio of the upper bottom length of the channel material to the lower bottom length thereof is preferably from 0.6 to 1.4, and more preferably from 0.8 to 1.2.

From the viewpoint of reducing the flow resistance, the shape of the projection 301 is preferably straight columnar vertical to the surface of the separation membrane. Alternatively, the projection 301 may be formed so that the higher part thereof has the smaller width, on the contrary, so that the higher part thereof has the larger width, or so that it has the same width regardless of the height from the surface of the separation membrane.

However, as far as the projection is not significantly collapsed during pressure filtration, an upper side of the cross section of the projection 301 may be rounded.

The projections 301 can be formed of a thermoplastic resin. When the projections 301 are formed of the thermoplastic resin, the shape of the channel material can be freely adjusted so as to satisfy conditions of the required separation characteristics and permeation performance by varying the processing temperature and the type of thermoplastic resin to be selected.

In addition, the shape of the projection 301 in the plane direction of the separation membrane may be linear as a whole, as shown in FIG. 5 and FIG. 6, or may be any other shape, for example, a curved shape, a saw-toothed shape or a waved shape. In these shapes, the projections 301 may be aligned in a dashed line or a dotted line. From the viewpoint of reducing the flow resistance, the dot line or the dashed line is preferred. However, the projections are interrupted and therefore the membrane sinking occurs at many positions during pressure filtration. Accordingly, the shape may be appropriately set in accordance with the use.

In the case where the shape of the projection 301 in the plane direction of the sheet 302 is linear, the neighboring projections may be arranged in nearly parallel with each other. The expression "arranged in nearly parallel" includes, for example, cases where the projections do not cross each other on the separation membrane, cases where the angle between the longitudinal directions of the adjacent two projections is from 0° to 30°, cases where the above-mentioned angle is from 0° to 15°, cases where the above-mentioned angle is from 0° to 5°, and the like.

The angle between the longitudinal direction of the projection 301 and the longitudinal direction of the water collection tube 6 is preferably from 60° to 120°, more preferably from 75° to 105°, and still more preferably from 85° to 95°. When the angle between the longitudinal direction of the projection and the longitudinal direction of the water collection tube falls within the above-mentioned range, the permeate can be efficiently collected in the water collection tube.

In order to stably form the flow channel, it is preferred that the separation membrane is suppressed from sinking when the separation membrane is pressurized in the separation membrane element. For that purpose, it is preferred that the contact area of the separation membrane with the projections is large, namely, that the area of the projections with respect to the area of the separation membrane (the projected area of the projections with respect to the membrane face of the separation membrane) is large. On the other hand, in order to decrease the pressure drop, it is preferred that the cross-sectional area of the flow channel is large. For the cross section of the flow channel, in order to ensure a large cross-sectional area of the flow channel while largely ensuring a contact area of the separation membrane vertical to the longitudinal direction of the flow channel with the projections, the cross-sectional shape of the flow channel is preferably a concave lens shape. In addition, the projection may have a straight columnar shape with no change in width in the cross-sectional shape in the direction vertical to the winding direction. On the other hand, the projection may have a shape varying in width in the cross-sectional shape in the direction vertical to the winding direction, such as a trapezoidal wall-like structure, an elliptic column, an elliptic cone, a quadrangular pyramid or a hemisphere, as far as the separation membrane performance has no influence thereon.

The shape of the projection 301 should not be construed as being limited to those shown in FIGS. 5 to 7. When the projections are arranged by fixing a molten material to the sheet 302, for example, by a hot-melt technique, the shape of the projection 301 can be freely adjusted so as to satisfy conditions of the required separation characteristics and permeation performance by varying the processing temperature and the type of hot-melt resin to be selected.

In FIG. 5, the plane shape of the projection 301 is linear in the lengthwise direction. However, as long as the projection 301 is formed so as to be convex to the surface of the separation membrane 2, and within the range not impairing the desired effects as the separation membrane element, it can be changed to another shape. That is, the shape of the projection in the plane direction may be a curved line shape, a wavy line shape or the like. In addition, the plurality of projections contained in one separation membrane may be formed so as to be different in at least either width or length from each other.

(Projected Area Ratio)

In terms of particularly reducing the flow resistance in the permeate-side flow channel and stably forming the flow channel, the projected area ratio of the projections 301 to the area of the permeate-side face of the separation membrane is preferably from 0.03 to 0.85, more preferably from 0.15 to 0.85, still more preferably from 0.20 to 0.75, and particularly preferably from 0.3 to 0.6. The projected area ratio is a value obtained by cutting out the separation membrane and the permeate-side channel material in 5 cm×5 cm, and dividing by the cut-out area (25 cm$^2$) the projected area of the channel material obtained when the permeate-side channel material is projected to a plane parallel to the plane direction of the separation membrane.

(Absent Ratio)

As shown in FIG. 8, water which has permeated the separation membrane 2 passes through the permeate-side flow channel 5 and is collected in the water collection tube 6. In the separation membrane 2, water which has permeated a region distant from the water collection tube 6, that is, a region close to an outside end in the winding direction (a region close to a right-side end in FIG. 8) joins together with water which has permeated a region more inside in the winding direction, while flowing toward the water collection tube 6, and thus further flows toward the water collection tube 6. Accordingly, in the permeate-side flow channel 5, the amount of water present in a region more distant from the water collection tube 6 is smaller.

Consequently, in the region close to the outside end in the winding direction, even though the permeate-side channel material does not exist and therefore the flow resistance in the region is increased, an influence thereof on the fresh water production rate in the entire separation membrane element is little. For the same reason, in the region close to the outside end in the winding direction, even though the projection formation accuracy is low and the resin to form the projections is continuously applied in the first direction (the widthwise direction of the separation membrane), an influence thereof on the fresh water production rate in the separation membrane element is little. The same shall apply to the case where the resin to form the projections is applied continuously without interruption in the plane direction (x-y plane) of the separation membrane in this region.

Figure 9:
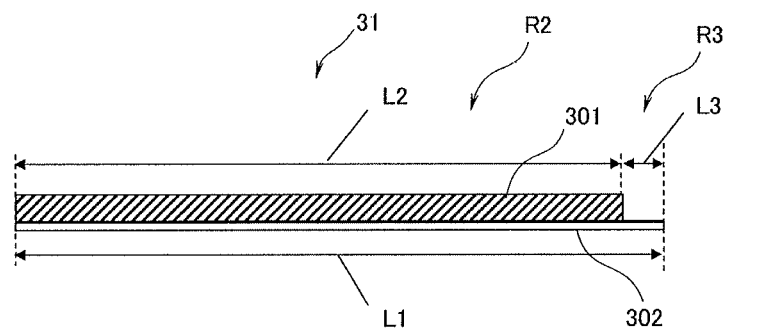
FIG. 9 is a cross-sectional schematic diagram showing a permeate-side channel material.
Figure 9:
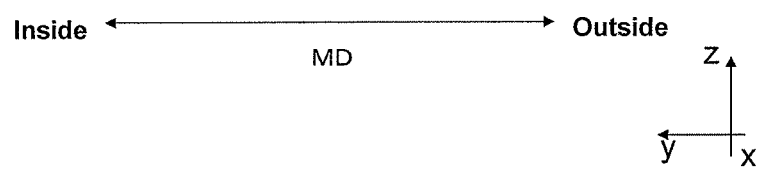

FIG. 9 is a cross-sectional view where the outside end in the winding direction of the permeate-side channel material 31 is cut along the lengthwise direction of the projection 301. In FIG. 9, the projection 301 is fixed to the sheet 302, and extends just before the outside end in the winding direction of the permeate-side channel material 31. In FIG. 9, for convenience of explanation, a configuration where the projection 301 is provided continuously in the lengthwise direction is shown, but as already described above, the above-mentioned various configurations may be applied to the projection 301.

In FIG. 9, a region where the projection 301 is provided is expressed by R2, and a region where the projection 301 (permeate-side channel material) is not provided is expressed by R3. Namely, the region R2 is a region where the permeate-side flow channel is formed. Also, the length in the MD direction of the separation membrane 2 is expressed by L1, the length in the MD direction of the projection 301 (that is, the length of the region R2) is expressed by L2, and the length in the MD direction of the region R3 where the projection 301 does not exist is expressed by L3. Here, the MD direction means the lengthwise direction of the separation membrane and the winding direction of the separation membrane.

As shown in FIG. 9, the proportion of the distance from the outside end in the winding direction of the sheet in the permeate-side channel material 31 to the outside end in the winding direction of the projection 301, namely, the length L3 in the second direction (the lengthwise direction of the separation membrane) of the region R3, which is a region provided at the outside end in the winding direction of the separation membrane 2 and a region where a permeate-side flow channel is not formed, relative to the length L1 in the second direction of the permeate-side channel material 31 (corresponding to the above-mentioned "length a of the separation membrane") is preferably from 0% to 30%, more preferably from 0% to 10%, and particularly preferably from 0% to 3%. This proportion is referred to as the absent ratio.

The absent ratio is represented by (L3/L1)×100(%).

In FIG. 9, for convenience of explanation, a configuration where the projection 301 is not provided in the region R3 is shown. However, the region R3 may be a region where the projection continuous in the widthwise direction is provided.

(2. Separation Membrane Element)

(2-1) Outline

As shown in FIG. 8, the separation membrane element 100 includes the water collection tube 6 and the separation membrane 2 having any of the above-mentioned configurations and being wound around the water collection tube 6.

(2. Separation Membrane)

<Outline>

As shown in FIG. 8, the separation membrane 2 are wound around the water collection tube 6, and arranged in such a manner that the widthwise direction of the separation membrane 2 runs along the longitudinal direction of the water collection tube 6. As a result, the separation membrane 2 is so arranged that the lengthwise direction thereof runs along the winding direction.

Consequently, as shown in FIG. 8, the projections 301 are arranged discontinuously at least relative to the longitudinal direction of the water collection tube 6, on the permeate-side face 22 of the separation membrane 2. Namely, the permeate-side flow channel 5 is so formed as to be continuous from the outside end to the inside end of the separation membrane in the winding direction. As a result, the permeate may readily reach the water collection tube 6 positioned in the center. That is, the flow resistance is decreased, and therefore a large fresh water production rate is obtained.

The expressions "inside in the winding direction" and "outside in the winding direction" are as shown in FIG. 8. Namely, "the inside end in the winding direction" and "the outside end in the winding direction" correspond to the ends closer to and distant from the water collection tube 6, respectively, in the separation membrane 2.

As described above, the projection may not reach the edge of the separation membrane. For example, therefore, in FIG. 8, the projection may not be provided in the outside end of an envelope-shaped membrane (separation membrane 2) in the winding direction and the end of an envelope-shaped membrane (separation membrane 2) in the longitudinal direction of the water collection tube.

<Envelope-Shaped Membrane>

In an embodiment of the present invention, as shown in FIG. 1, the separation membranes 2 form the separation membrane pair 1 in which the separation membranes 2 are so arranged that the permeate-side faces 22 thereof face each other, when incorporated in the separation membrane element.

In one embodiment of the present invention, the envelope-shaped membrane is formed by stacking the separation membranes 2 (membrane leaves 4) each so bent that the feed-side faces 1 thereof face each other, and arranging them so that the permeate-side face 22 of one separation membrane 2 faces the permeate-side face 22 of the other separation membrane 2. The envelop-shaped membrane is a pair of separation membranes which are so arranged that the permeate-side faces thereof face each other. The envelope-shaped membrane is rectangular in shape, and gaps between the permeate-side faces in the rectangular shape of the separation membrane are left open only at one edge on the inner side thereof in the winding direction and sealed at the other three edges so that permeate flows into the water collection tube 6. The permeate is isolated from raw water by this envelope-shaped membrane.

Examples of sealing modes include a mode of adhesion with an adhesive, a hot melt or the like, a mode of fusion by heating, laser or the like, and a mode of rubber sheet insertion. The sealing by adhesion is especially preferred because it is most convenient and highly effective.

In addition, for the feed-side face of the separation membrane, the inside end in the winding direction is closed by folding or sealing. When the feed-side face of the separation membrane is not folded but sealed, deflection at the end of the separation membrane is hardly generated. By suppressing the generation of the deflection near a fold, the generation of gaps between the separation membranes at the time of winding and the occurrence of leakage due to the gaps are suppressed.

By thus suppressing the occurrence of the leakage, the recovery ratio of the envelope-shaped membrane is improved. The recovery ratio of the envelope-shaped membrane is determined as follows. That is, an air leak test of the separation membrane element is conducted in water, and the number of the envelope-shaped membranes through which leakage has occurred is counted. Based on the count results, the ratio of (the number of envelope-shaped membranes through which air leakage has occurred)/(the number of envelope-shaped membranes subjected to the test) is calculated as the recovery ratio of the envelope-shaped membrane.

A specific method of the air leak test is as follows. An end of a center pipe of the separation membrane element is sealed, and air is introduced from the other end. The introduced air passes through holes of the water collection tube and reaches the permeate side of the separation membrane. However, when the deflection is generated near the fold due to the insufficient folding of the separation membrane and therefore the gaps are present as described above, the air runs through the gaps. As a result, the air runs toward the feed side of the separation membrane, and the air reaches in water from the end (feed side) of the separation membrane element. In this manner, the air leak can be confirmed as generation of bubbles.

When the separation membrane leaf is formed by folding, the longer the leaf is (namely, the longer the original separation membrane is), the longer the time required to fold the separation membrane is. However, by sealing the feed-side face of the separation membrane, not by folding, an increase in production time can be suppressed even when the leaf is long.

In the membrane leaf and the envelope-shaped membrane, the separation membranes facing each other may have the same configuration, or may each have a different configuration. That is, in the separation membrane element, it is only required that the above-mentioned permeate-side channel material is provided on at least one of the permeate-side faces facing each other, and therefore the separation membrane having the permeate-side channel material and the separation membrane having no permeate-side channel material may be alternately stacked. For convenience of explanation, however, in descriptions of the separation membrane element and related thereto, the "separation membrane" include the separation membrane having no permeate-side channel material (for example, a membrane having the same configuration as the separation membrane).

The separation membranes facing each other at the permeate-side face of the separation membrane or at the feed-side face thereof may be two different membranes or may be one membrane folded.

(2-3) Permeate-Side Flow Channel

As described above, in the permeate-side channel material 31, the sheet 302 is provided with the projections 301. By the projections 301, the permeate-side flow channel is formed inside the envelope-shaped membrane, namely between the permeate-side faces of the separation membranes facing each other.

(2-4) Feed-Side Flow Channel
(Channel Material)

As shown in FIG. 1, the separation membrane element 100 has the feed-side channel material 32 having a projected area ratio thereof relative to the separation membrane 2 of higher than 0 and lower than 1 between the feed-side faces 21 of the separation membranes 2 facing each other.

The projected area ratio of the feed-side channel material is preferably from 0.03 to 0.50, more preferably from 0.10 to 0.40, and particularly preferably from 0.15 to 0.35. When the projected area ratio is from 0.03 to 0.50, the flow resistance can be suppressed to a relatively small value. The projected area ratio is a value obtained by cutting out the separation membrane and the feed-side channel material in 5 cm×5 cm, and dividing by the cut-out area (25 cm$^2$) the projected area of the channel material obtained when the feed-side channel material is projected to a plane parallel to the plane direction of the separation membrane.

The height (thickness) of the feed-side channel material is preferably from more than 0.5 mm to 2.0 mm, and more preferably from 0.6 mm to 1.0 mm, in consideration of the balance between respective performances and the operation cost as described later.

The shape of the feed-side channel material is not particularly limited, and it may have a continuous shape or a discontinuous shape. The channel materials having a continuous shape include members such as a film and a net. The continuous shape as used herein means that the channel material is substantially continuous throughout the entire range thereof. The continuous shape may include parts where the channel material is partially discontinuous to an extent of not causing disadvantage such as a decrease in the amount of fresh water produced. The definition of "discontinuous" is as described in the above-mentioned <Permeate-Side Channel Material>. The material for the feed-side channel material is not particularly limited, and it may be a material which is the same as or different from that of the separation membrane.

(2-5) Water Collection Tube

It is only required that the water collection tube 6 is constituted so as to allow the permeate to flow therethrough, and the material, shape and size thereof and the like are not particularly limited. As the water collection tube 6, for example, a cylindrical member having a side surface provided with a plurality of holes is used.

(2-6) First Embodiment

Figure 10:
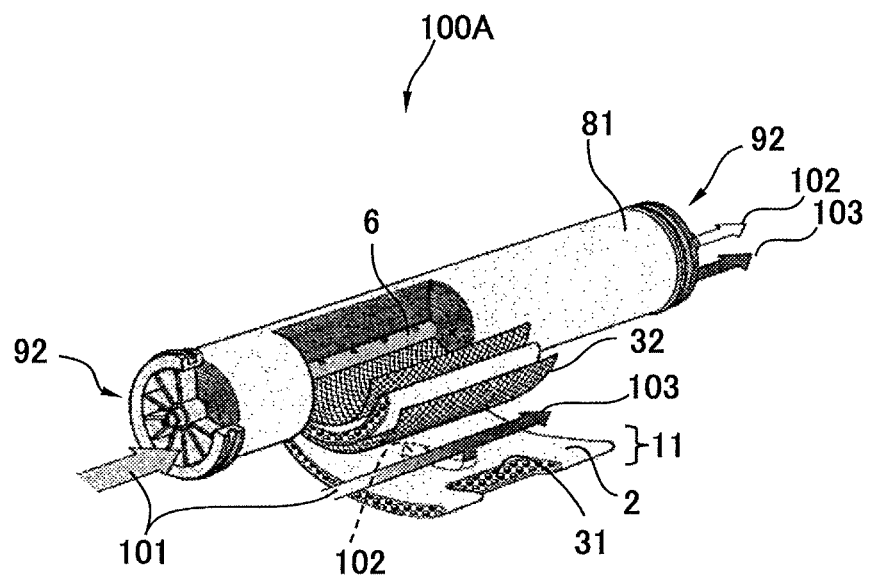
FIG. 10 is a partially developed perspective view showing a first embodiment of a separation membrane element.
Figure 11:
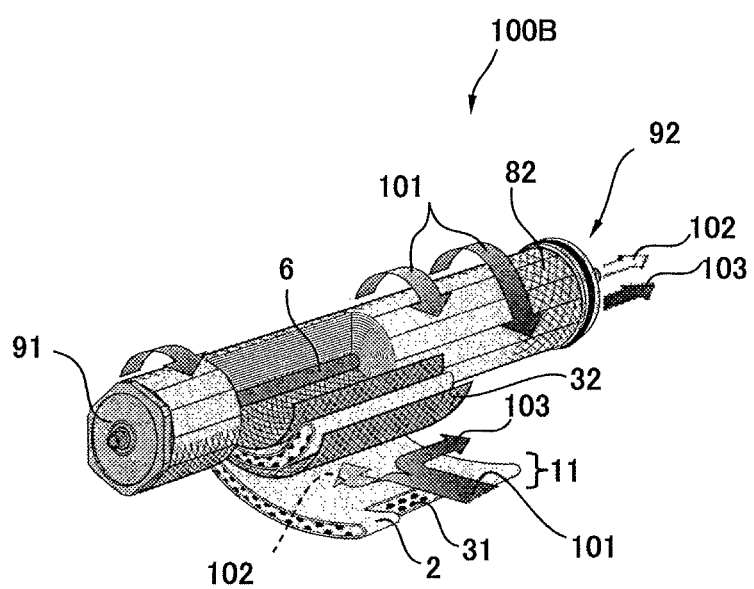
FIG. 11 is a partially developed perspective view showing a second embodiment of a separation membrane element.
Figure 12:
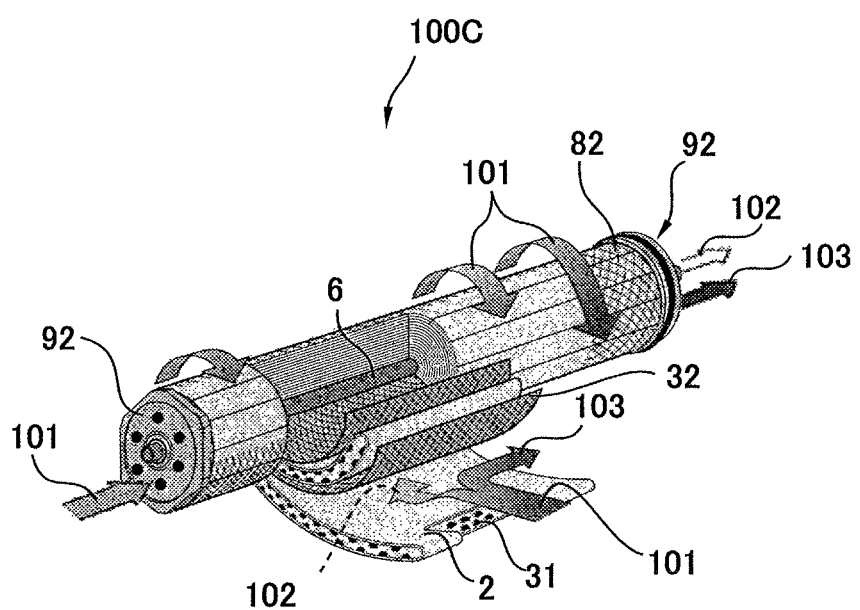
FIG. 12 is a partially developed perspective view showing a third embodiment of a separation membrane element.

As more specific embodiments, separation membrane elements 100A, 100B and 100C of first to third embodiments are shown in FIG. 10 to FIG. 12.

FIG. 10 is a partially exploded explanatory view showing the separation membrane element 100A of the first embodiment, and a plurality of separation membranes 2 are wound around a water collection tube 6. Also, the separation membrane element 100A further has the following configuration, in addition to the above-mentioned configuration.

That is, the separation membrane element 100A is provided with end plates 92 with holes at both ends (namely, a first end and a second end) thereof. Also, in the separation membrane element 100A, an exterior body 81 is wound around an outer periphery of the wound separation membrane (hereinafter, referred to as a "wound body").

An end plate 91 without holes described later is not provided with holes through which the raw water can pass, while the end plate 92 with holes is provided with a plurality of holes through which the raw water can pass.

In addition, the separation membrane 2 forms an envelope-shaped membrane 11, and a permeate-side channel material 31 provided with projections 301 is arranged on the inner side of the envelope-shaped membrane 11 as described above. A feed-side channel material 32 is arranged between the envelope-shaped membranes 11.

For the sake of convenience, in FIG. 10 to FIG. 12, the projections 301 of the permeate-side channel material 31 is shown in a dot shape, but the shape of the permeate-side channel material is not limited to this shape, as described above.

Water treatment using the separation membrane element 100A is described below. Raw water 101 supplied from the first end of the separation membrane element 100A passes through the holes of the end plate 92 and flows into a feed-side flow channel. The raw water 101 thus brought into contact with the feed-side face of the separation membrane 2 is separated into permeate 102 and concentrate 103 by the separation membrane 2. The permeate 102 flows into the water collection tube 6 through the permeate-side flow channel. The permeate 102 having passed through the water collection tube 6 flows out of the separation membrane element 100A through the second end of the separation membrane element 100A. The concentrate 103 passes through the feed-side flow channel and flows out of the separation membrane element 100A through the holes of the end plate 92 disposed at the second end.

(2-7) Second Embodiment

With reference to FIG. 11, the separation membrane element 100B of the second embodiment is described. The constituent elements previously described are designated by like reference numerals and signs, and descriptions thereof are omitted.

The separation membrane element 100B is provided with an end plate 91 which is arranged at the first end and does not have holes, and an end plate 92 with holes which is disposed at the second end and has holes. In addition, the separation membrane element 100B is provided with a porous member 82 further wound around an outermost surface of the wound separation membrane 2.

As the porous member 82, a member having a plurality of pores through which the raw water can pass is used. These pores provided in the porous member 82 may also be said as a feed port of the raw water. The material, size, thickness and rigidity thereof and the like are not particularly limited, as long as the porous member has the plurality of pores. The membrane area per unit volume of the separation membrane element can be increased by employing a member having a relatively small thickness as the porous member 82.

The thickness of the porous member 82 is, for example, preferably 1 mm or less, more preferably 0.5 mm or less, and still more preferably 0.2 mm or less. Additionally, the porous member 82 may be a member having flexibility or elasticity, which can be deformed along a periphery shape of the wound body. More specifically, a net, a porous film or the like are applicable as the porous member 82. The net and the porous film may each be formed into a tube shape so that the wound body can be contained in the inside thereof, or may each be in an elongated shape and wound around the wound body.

The porous member 82 is arranged on the outer periphery of the separation membrane element 100B. By arranging the porous member 82 in this way, the pores are provided on the outer periphery of the separation membrane element 100B. In particular, the "outer periphery" may also be said as a portion of the whole outer periphery of the separation membrane element 100B, except for the above-mentioned first end face and second end face. In this embodiment, the porous member 82 is arranged so as to cover almost entirely the outer periphery of the wound body.

According to this embodiment, the raw water is fed from the outer periphery of the separation membrane element 100B (the outer periphery of the wound body) through the porous member 82. It is therefore possible to suppress deformation (so-called telescope) of the wound body due to extrusion of the wound separation membrane 2 and the like in a longitudinal direction thereof, even when the separation membrane element 100B is repeatedly operated, or even when the separation membrane element 100B is operated under high-pressure conditions. Furthermore, in this embodiment, the raw water is fed from a space between a pressure vessel (not shown) and the separation membrane element, and therefore the occurrence of abnormal retention of the raw water is suppressed.

In the separation membrane element 100B, the end plate at the first end is the end plate 91 without holes, and therefore the raw water does not flow into the separation membrane element 100B from the first end face. The raw water 101 is fed from the outer periphery of the separation membrane element 100B to the separation membrane 2 through the porous member 82. The raw water 101 thus fed is separated into the permeate 102 and the concentrate 103 by the separation membrane. The permeate 102 passes through the water collection tube 6 and is taken out of the second end of the separation membrane element 100B. The concentrate 103 passes through the holes of the end plate 92 with holes of the second end, and flows out of the separation membrane element 100B.

(2-8) Third Embodiment

With reference to FIG. 12, the separation membrane element 100C of the third embodiment is described. The constituent elements previously described are designated by like reference numerals and signs, and descriptions thereof are omitted.

The separation membrane element 100C is the same as the separation membrane element of the second embodiment except for being provided with end plates 92 with holes which are arranged at the first end and the second end, respectively. In addition, the separation membrane element 100C is provided with a porous member 82 as with the separation membrane element 100B.

By this configuration, in this embodiment, the raw water 101 is fed not only from the outer periphery of the separation membrane element 100C to the wound body through the pores of the porous member 82, but also from the first end of the separation membrane element 100C to the wound body through the holes of the end plate 92 with holes of the first end. The permeate 102 and the concentrate 103 are discharged from the second end to the outside of the separation membrane element 100C as with the separation membrane element 100A of the first embodiment.

The raw water is fed not only from one end (namely, the end plate 92 with holes) of the separation membrane element 100C, but also from the outer periphery of the separation membrane element 100C, to the wound body through the porous member 82. It is therefore possible to suppress deformation of the wound body. Also in this embodiment, the raw water is fed from the space between the pressure vessel and the separation membrane element, and therefore, the occurrence of abnormal retention of the raw water is suppressed.

[3. Method for Producing Separation Membrane Element]

Respective steps in a method for producing the separation membrane element are described below.

(3-1) Production of Separation Membrane and Post-Processing

Although the method for producing the separation membrane is described above, it is briefly summarized as follows.

A resin is dissolved in a good solvent, and the resulting resin solution is cast on a substrate and immersed in pure water to combine the porous supporting layer with the substrate. Thereafter, as described above, a separation functional layer is formed on the porous supporting layer. Further, in order to enhance separation performance and permeation performance, chemical treatment with chlorine, acid, alkali, nitrous acid or the like is carried out as required, and furthermore, a monomer and the like are washed out to prepare a continuous sheet of the separation membrane.

Before or after the chemical treatment, unevenness may be formed on the separation membrane by embossing or the like. The channel material may be formed with the resin on the permeate-side face and/or the feed-side face of the separation membrane.

When a process for providing unevenness to the separation membrane is conducted, it is also possible to give the height difference to the feed side of the separation membrane by a method such as emboss forming, hydraulic forming or calendering.

When the feed-side flow channel is a continuously formed member such as a net, the separation membrane may be produced by arranging the permeate-side channel material on the separation membrane, and then, the separation membrane and the feed-side channel material may be stacked on each other.

A method for arranging the projections has, for example, a step of arranging a soft material on the sheet, and a step of curing it. Specifically, for arrangement of the projections, a thermoplastic resin, a UV-curable resin, chemical polymerization, a hot melt, drying or the like is used. In particular, the thermoplastic resin or the hot melt is preferably used. Specifically, it includes a step of softening the material such as the resin or the like by heat (namely, performing hot melting), a step of arranging the softened material on the separation membrane, and a step of curing the material by cooling to be fixed on the sheet.

Examples of methods for arranging the projections include coating, printing, and spraying. Examples of equipments used include a nozzle-type hot-melt applicator, a spray-type hot-melt applicator, a flat nozzle-type hot-melt applicator, a roll coater, an extrusion coater, a gravure printer, and a sprayer.

(3-2) Formation of Membrane Leaf

As described above, the membrane leaf may be formed by folding the separation membrane in such a manner that the feed-side face thereof faces inward, or may be formed by bonding the two separate separation membranes to each other in such a manner that the feed-side faces thereof face each other.

The method for producing the separation membrane element preferably has a step of sealing the inside ends in the winding direction of the separation membrane at the feed-side face thereof. In the sealing step, the two separation membranes are stacked on each other in such a manner that the feed-side faces of the two separation membranes face each other. Further, the inside ends in the winding direction of the stacked separation membranes, that is, the left-side ends in FIG. 8 are sealed in such a manner that the permeate can flow into the water collection tube 6.

Examples of methods of "sealing" include adhesion with an adhesive, a hot melt or the like, fusion by heating, laser or the like, and a method of inserting a rubber sheet. The sealing by adhesion is especially preferred, because it is most simple and effective.

At this time, a feed-side channel material prepared separately from the separation membrane may be arranged between the feed-side faces of the stacked separation membranes. As described above, by previously providing the height difference on the feed-side face of the separation membrane by embossing, resin coating or the like, arrangement of the feed-side channel material can be omitted.

Either sealing of the feed-side face or sealing of the permeate-side face (the formation of envelope-shaped membrane) may be carried out first, or sealing on the feed-side face and sealing on the permeate-side face may be carried out in parallel with each other while overlaying the separation membranes. However, in order to suppress the occurrence of wrinkles in the separation membrane during winding, it is preferred that solidification or the like of the adhesive or the hot melt at the ends in the widthwise direction, namely, solidification or the like for forming the envelope-shaped membrane is completed after the termination of winding so as to allow the neighboring separation membranes to deviate from each other in the lengthwise direction by winding.

(3-3) Formation of Envelope-Shaped Membrane

The envelope-shaped membrane can be formed by folding one separation membrane so that the permeate-side face thereof faces inward, with the sheet provided with the above-mentioned projections (permeate-side channel material) sandwiched therebetween, followed by bonding thereof, or by stacking two separation membranes so that the permeate-side faces thereof face inward, with the above-mentioned sheet provided with the projections (permeate-side channel material) sandwiched between one separation membrane and the other separation membrane, followed by bonding thereof. In the rectangular envelope-shaped membrane, three sides are sealed so that only one end in the lengthwise direction is open. The sealing can be carried out by adhesion with an adhesive, a hot melt or the like, fusion by heat or laser, or the like.

At this time, in the sealed part, the sheet may be present between the separation membranes, or the sheet may be arranged in an inner side of the sealed part of the separation membranes.

The viscosity of the adhesive used for formation of the envelope-shaped membrane is preferably within a range of from 40 P (poise) to 150 P (poise), and more preferably from 50 P (poise) to 120 P (poise). In the case where the viscosity of the adhesive is too high, more wrinkles tend to occur when the stacked leaves are wound around the water collection tube. The wrinkles may impair the performance of the separation membrane element. On the contrary, in the case where the viscosity of the adhesive is too low, the adhesive may bleed out from the ends of the leaves to contaminate devices. In addition, when the adhesive adheres to any other part than a part to be adhered, the performance of the separation membrane element is impaired, and working efficiency is greatly lowered due to operation for treating the leaked adhesive.

The amount of the adhesive to be applied is preferably such an amount that the width of a part to which the adhesive is applied is from 10 mm to 100 mm, after the leaves have been wound around the water collection tube. Thereby, the separation membranes can be surely adhered, and therefore, inflow of the raw water into the permeate side can be suppressed. In addition, the effective membrane area of the separation membrane element can be relatively largely secured.

As the adhesive, a urethane adhesive is preferred. In order to set the viscosity of the urethane adhesive to a range of from 40 P (poise) to 150 P (poise), it is preferred that an isocyanate as a main ingredient and a polyol as a curing agent are mixed to a weight ratio of isocyanate/polyol of from 1/5 to 1. The viscosity of the adhesive is obtained by measuring the viscosity of a mixture in which the main ingredient, the single curing agent and the blending ratio thereof are previously defined, with a B-type viscometer (JIS K 6833).

When the sheet is present in the sealed part, the separation membranes can be adhered to each other through the sheet with the adhesive permeated in the sheet. In addition, when there is no sheet in the sealed part, the separation membranes are directly bonded to each other.

(3-4) Winding of Separation Membrane

In the production of the separation membrane element, a conventional element manufacturing apparatus can be used. And, as a method for manufacturing the element, any of the methods described in reference literatures (JP-B-44-14216, JP-B-4-11928 and JP-A-11-226366) can be used. Details thereof are as follows.

When the separation membrane is wound around the water collection tube, the separation membrane is so arranged that the end of the leaf, namely, the closed part of the envelope-shaped membrane, faces the water collection tube. By winding the separation membrane around the water collection tube in such an arrangement, the separation membrane is spirally wound.

When a spacer such as tricot or a substrate is wound around the water collection tube, the adhesive applied to the water collection tube at the time of winding the element hardly flows, leading to suppression of leakage, and further, the flow channel around the water collection tube can be stably secured. The spacer may be wound longer than the circumference of the water collection tube.

(3-5) Other Steps

The method for producing the separation membrane element may include additionally winding a film, filaments or the like around the outside of the wound body of the separation membrane formed as described above, and may include additional steps such as edge cutting in which the edges of the separation membrane in the longitudinal direction of the water collection tube are evenly cut, and attachment of the end plates.

[4. Use of Separation Membrane Element]

The separation membrane elements may be used as a separation membrane module by being connected in series or in parallel and housed in a pressure vessel.

In addition, the above-mentioned separation membrane element and separation membrane module can be configured as a fluid separation apparatus in combination with a pump for feeding a fluid thereto, a device for pre-treating the fluid, and the like. By using the fluid separation apparatus, for example, the raw water is separated into the permeate such as drinkable water and the concentrate not having permeated through the membrane, whereby water meeting the intended purpose can be obtained.

The higher the operation pressure of the fluid separation apparatus is, the more the removal efficiency is improved, but the more energy is required for the operation. Additionally, also considering retention of the feed flow channel and the permeate flow channel of the separation membrane element, the operation pressure at the time when water to be treated is permeated through the separation membrane module is preferably from 0.2 MPa to 5 MPa. When the raw water temperature is increased, the salt removal ratio is decreased. As the raw water temperature decreases, so does the membrane permeation flux. Therefore, the raw water temperature is preferably from 5° C. to 45° C. In addition, in the case where the pH of the raw water is in a neutral region, even when the raw water is a liquid having a high salt concentration such as seawater, deposition of magnesium scale or the like is suppressed, and degradation of the membrane is also suppressed.

The fluid to be treated with the separation membrane element is not particularly limited, and when the separation membrane element is used in water treatment, examples of the raw water include liquid mixtures containing 500 mg/L to 100 g/L of TDS (Total Dissolved Solids), such as seawater, brackish water and waste water. In general, TDS refers to the amount of total dissolved solids, and is expressed by "mass divided by volume". However, considering 1 L as 1 kg, it may be expressed by "mass ratio". According to the definition thereof, TDS can be calculated from the weight of a residue obtained when a solution filtered through a 0.45-μm filter is evaporated at a temperature of 39.5° C. to 40.5° C., but more conveniently, it is converted from practical salinity (S).

EXAMPLES

The present invention is described below in more detail with reference to the Examples. However, the present invention should not be construed as being limited by these Examples.

(Thickness of Sheet and Height of Projections)

The thickness of the sheet and the height of the projections were measured with a high-precision configuration analysis system "KS-1100" manufactured by KEYENCE CORPORATION. Specifically, regarding the height of the projections, using the high-precision configuration analysis system "KS-1100" manufactured by KEYENCE CORPORATION, the average height difference was analyzed from the measurement results of the permeate side of 5 cm×5 cm. 30 points with a height difference of 10 μm or more were measured and respective height values were totaled. The totaled value was divided by the number of the total measurement points (30 points). The resulting value was referred to as the height of the projections.

(Pitch, Distance, Width and Length of Permeate-Side Channel Material)

Using the high-precision configuration analysis system "KS-1100" manufactured by KEYENCE CORPORATION, the horizontal distance from a peak of the channel material on the permeate side of the separation membrane to a peak of a neighboring channel material was measured at 200 points, and the average value thereof was calculated as the pitch.

In addition, the distance b, the distance e, the width d and the length f were measured by the above-mentioned methods in the photograph used for measurement of the pitch (see FIG. 5 and FIG. 6).

(Pitch between Densely Fused Parts)

Using the high-precision configuration analysis system "KS-1100" manufactured by KEYENCE CORPORATION, the horizontal distance between a gravity center position of a certain densely fused part and a gravity center position of another densely fused part adjacent to this densely fused part was measured at 50 points.

(Dense Fusion Ratio and Surface Pore Ratio by Scanning Method)

The permeate-side channel material cut to 50 mm×50 mm was scanned with a digital scanner (CanoScan N676U manufactured by Canon Inc.) for the face to which the projections were fixed, and a digital image obtained was analyzed with an image analyzing software (ImageJ). For the region where the projections are not fixed of the resulting image, calculation was performed as the dense fusion ratio or the surface pore ratio (%)=100×(area of densely fused parts or pores/cut-out area). This operation was repeated 50 times, and the average value thereof was referred to as the dense fusion ratio or the surface pore ratio.

(Dense Fusion Ratio and Surface Pore Ratio by Microscope Method)

Using the high-precision configuration analysis system "KS-1100" manufactured by KEYENCE CORPORATION, an image was photographed at a magnification of 100 times from the face to which the permeate-side channel material projections were fixed, and the image was made black-and-white by setting numerical values of the texture to zero. The digital image obtained was analyzed with the image analyzing software (ImageJ). For the region where the projections were not fixed of the resulting image, calculation was performed as the dense fusion ratio or the surface pore ratio (%)=100×(area of densely fused parts or pores/cut-out area). This operation was repeated 30 times, and the average value thereof was referred to as the dense fusion ratio or the surface pore ratio.

(Porosity)

The apparent volume ($cm^3$) of a dry sample was measured, and subsequently, the sample was allowed to contain pure water, followed by measuring the weight thereof. A value obtained by subtracting the weight of the dry sample from the weight of the sample containing water, namely, the weight of water (g: that is, the volume $cm^3$ of water) which entered into voids of the substrate, was calculated, and divided by the apparent volume of the sample to obtain the porosity expressed in percentage (%).

(Face Arithmetic Average Height)

For the face of the permeate-side channel material on which the projections were arranged and for the face opposite thereto, measurement was performed at any 30 points under the following conditions using a one-shot 3D measuring macroscope manufactured by KEYENCE CORPORATION to obtain the average value of the face arithmetic average height.

Measurement magnification: 40 times
Measurement range: 5 mm×5 mm
Filter: Gaussian
Correction of termination effect: Effective
S filter: Not used
L filter: 0.8 mm (Fresh Water Production Rate)

The separation membrane or the separation membrane element was operated under conditions of an operation pressure of 0.7 MPa and a temperature of 25° C. for 100 hours using a NaCl aqueous solution having a concentration of 1,000 mg/L and a pH of 6.5 as feed water. Thereafter, sampling was performed for 10 minutes, and the water permeation rate (cubic meter) per unit area of the membrane per day was expressed as the fresh water production rate ($m^3$/day).

(Desalination Ratio (TDS Removal Ratio))

For the raw water used in operation for 10 minutes for measurement of the fresh water production rate and the sampled permeate, the TDS concentration was measured by conductivity measurement, and from the following formula, the TDS removal ratio was calculated.

TDS removal ratio (%)=100×{1−(TDS concentration in permeate/TDS concentration in raw water)}

(Peeling Ratio)

The permeate-side channel material in which the projections were fixed to the sheet was cut at 5 m/min in the CD direction using a single edge, and the ratio of the number of stripes peeled from the sheet to the total number of the projections was calculated as the peeling ratio. This test was performed 100 times, and the average value thereof was referred to as the peeling ratio.

(Absent Ratio)

For all wall-like structures, the length L1 of the separation membrane and the length L3 of the distance where the wall-like structure was not present from the end far from the water collection tube to the length of the separation membrane or coated all over were measured. After calculation based on the formula of the absent ratio (%)=L3/L1×100, the average value per wall-like structure was determined. The resulting average value is hereinafter referred to as the "absent ratio".

Example 1

On a nonwoven fabric made of polyethylene terephthalate fibers (fiber diameter: 1 decitex, thickness: about 0.09 mm, density: 0.80 g/$cm^3$), a 15.0 mass % DMF solution of a polysulfone was cast to a thickness of 180 µm at room temperature (25° C.). Immediately thereafter, the fabric was immersed in pure water, left therein for 5 minutes, and immersed in hot water at 80° C. for 1 minute to prepare a porous supporting layer (thickness: 0.13 mm) made of a fiber-reinforced polysulfone supporting membrane.

Thereafter, the porous supporting layer roll was unwound, and an aqueous solution containing 1.9% by mass of m-PDA (metaphenylenediamine) and 4.5% by mass of ε-caprolactam were applied onto the polysulfone surface. Nitrogen was sprayed thereon through an air nozzle to remove the excessive aqueous solution from the surface of the supporting membrane, and thereafter a n-decane solution containing 0.06% by mass of trimesic acid chloride at a temperature of 25° C. was applied so as to completely wet the surface.

Then, the excessive solution was removed from the membrane by an air blow, followed by cleaning with hot water at 50° C. to obtain a separation membrane roll.

The separation membrane thus obtained was folded and cut to an effective area of 37.0 $m^2$ in a separation membrane element, and a net (thickness: 0.7 mm, pitch: 5 mm×5 mm, fiber diameter: 350 µm, projected area ratio: 0.13) was used as a feed-side channel material. Thus, 26 leaves having a width of 900 mm and a leaf length of 800 mm were prepared.

On the other hand, projections were formed over the whole sheet. That is, using an applicator loaded with a comb-shaped shim having a slit width of 0.5 mm and a pitch of 0.9 mm, composition pellets containing 60% by mass of highly crystalline PP (MFR: 1,000 g/10 min, melting point: 161° C.) and 40% by mass of a low crystalline α-olefinic polymer (manufactured by Idemitsu Kosan Co., Ltd., low stereoregular polypropylene "L-MODU·S400" (trade name)) were linearly applied at a resin temperature of 205° C. and a travelling speed of 10 m/min so as to become perpendicular to the longitudinal direction of a water collection tube when a separation membrane element was formed and so as to become perpendicular to the longitudinal direction of a water collection tube from an inside end to an outside end in the winding direction when an envelope-shaped membrane was formed, while adjusting the temperature of a backup roll to 20° C. The sheet was the nonwoven fabric as shown in Table 1.

For the shape of the resulting projections, the total of the thickness of the sheet and the projection height was 0.26 mm, the projection width was 0.5 mm, the distance between the neighboring projections in the first direction and the second direction was 0.4 mm, and the pitch was 0.9 mm.

The permeate-side channel material was stacked on the permeate-side face of the resulting leaf, and spirally wound around an ABS (acrylonitrile-butadiene-styrene) water collection tube (width: 1,020 mm, diameter: 30 mm, number of holes: 40 holes×one linear line), and a film was further wound around the outer periphery thereof. After fixed with a tape, edge cutting, end plate attachment and filament winding were performed to produce a separation membrane element having a diameter of 8 inches. Both the end plates were end plates with holes. Namely, in this example, the separation membrane element of the first embodiment shown in FIG. 10 was prepared.

The separation membrane element was loaded in a pressure vessel, and operation (yield ratio: 15%) was performed at an operation pressure of 0.7 MPa, an operation temperature of 25° C. and a pH of 6.5, using a NaCl aqueous solution having a concentration of 1,000 mg/L and a pH of 6.5. As a result, the fresh water production rate, the desalination ratio and the peeling ratio were as shown in Table 1.

Examples 2 to 12

Separation membranes and separation membrane elements were prepared in the same manner as in Example 1 except that the sheet was changed to nonwoven fabrics as shown in Tables 1 to 3 and that projections were as shown in Tables 1 to 3.

The separation membrane elements were each loaded in a pressure vessel and operated under the above-mentioned conditions to obtain a permeate. As a result, the fresh water production rate, the desalination ratio and the peeling ratio were as shown in Tables 1 to 3.

Examples 13 and 14

A separation membrane roll to which the wall-like structures obtained in Example 1 were fixed was folded and cut to a width of 256 mm and an effective area of 0.5 m² in a separation membrane element, and a net (thickness: 510 μm, pitch: 2 mm×2 mm, fiber diameter: 255 μm, projected area ratio: 0.21) was used as a feed-side channel material. Thus, 2 leaves were prepared.

Meanwhile, permeate-side channel materials were prepared in the same manner as in Example 1 except that the sheet was changed to the nonwoven fabrics as shown in Table 4 and that projections were as shown in Table 4.

Thereafter, each permeate-side channel material was stacked on the permeate-side face of the leaf, and wound around an ABS water collection tube (width: 300 mm, outside diameter: 17 mm, number of holes: 8 holes×two linear lines) to prepare a separation membrane element in which the 2 leaves were spirally wound. A film was wound around the outer periphery thereof. After fixed with a tape, edge cutting and end plate attachment were performed to produce a 2-inch element.

Each separation membrane element was loaded in a pressure vessel, and operation (yield ratio: 15%) was performed at an operation pressure of 0.7 MPa, an operation temperature of 25° C. and a pH of 6.5, using a NaCl aqueous solution having a concentration of 1,000 mg/L and a pH of 6.5. As a result, the fresh water production rate, the desalination ratio and the peeling ratio were as shown in Table 4.

Comparative Example 1

A biaxially drawn polyester film (Lumirror manufactured by Toray Industries, Inc., thickness: 0.03 mm) was used as the sheet. Due to its excessively high fusion ratio, the projections were not impregnated into the sheet, and the projections were peeled in some places during conveyance, resulting in failure to obtain a channel material.

Comparative Example 2

The sheet was changed to the nonwoven fabric as shown in Table 5, and the projections were arranged in the same manner as in Example 1. As a result, densely fused parts were not present in the sheet, and only coarsely fused parts and non-fused parts were present. Therefore, when the projections were fixed, permeation to a backside of the sheet occurred, resulting in failure to obtain a channel material.

As apparent from the results shown in Table 1 to Table 5, the separation membrane elements of Examples 1 to 12 of the present invention can each provide a sufficient amount of permeate having a high desalination ratio, even when operated for a long period of time, and it is fair to say that they stably have excellent separation performance.

TABLE 1

|  |  |  | Example 1 | Example 2 | Example 3 | Example 4 |
|---|---|---|---|---|---|---|
| Permeate-Side Channel Material | Nonwoven Fabric | Thickness (mm) | 0.05 | 0.05 | 0.05 | 0.05 |
|  |  | Material | Polyethylene terephthalate | Polyethylene terephthalate | Polyethylene terephthalate | Polyethylene terephthalate |
|  |  | Unit weight (g/m²) | 25 | 25 | 25 | 25 |
|  |  | Porosity (%) | 9 | 24 | 73 | 68 |
|  |  | Dense Fusion Ratio (%) (Scanning Method (Microscope Method)) | 80(78) | 60(58) | 7(6) | 15(14) |
|  |  | Pitch between Densely Fused Parts (mm) | <0.2 | <0.25 | <5 | <3 |
|  |  | Surface Pore Ratio (%) of Non-Fused Parts (Scanning Method (Microscope Method)) | 8(7) | 13(12) | 85(83) | 70(68) |
|  |  | Number of Pores (Pore: 150 to 200 μm) (Scanning Method (Microscope Method)) | 15(15) | 23(23) | 356(322) | 300(298) |

TABLE 1-continued

|  |  |  | Example 1 | Example 2 | Example 3 | Example 4 |
|---|---|---|---|---|---|---|
|  |  | Face Arithmetic Average Height (μm) | 3.0 | 3.5 | 8.1 | 7.5 |
|  |  | Shape of Densely Fused Part | Circle | Circle | Circle | Circle |
|  |  | Aspect Ratio | 1.0 | 1.0 | 1.0 | 1.0 |
|  |  | Pattern of Densely Fused Parts | — | — | — | — |
|  | Projections | Arrangement | Linear | Linear | Linear | Linear |
|  |  | Angle with Longitudinal Direction of Water Collection Tube (°) | 90 | 90 | 90 | 90 |
|  |  | Cross-Sectional Shape | Semicircle | Semicircle | Semicircle | Semicircle |
|  |  | Height H1 (mm) | 0.21 | 0.21 | 0.21 | 0.21 |
|  |  | Upper Bottom (mm) | 0.45 | 0.45 | 0.45 | 0.45 |
|  |  | Lower Bottom (mm) | 0.55 | 0.55 | 0.55 | 0.55 |
|  |  | Channel Material Distance b (mm) in First Direction (Widthwise Direction) | 0.40 | 0.40 | 0.40 | 0.40 |
|  |  | Width d (mm) of Channel Material | 0.50 | 0.50 | 0.50 | 0.50 |
|  |  | Channel Material Distance e (mm) in Second Direction (Lengthwise Direction) | 0 | 0.00 | 0.00 | 0.00 |
|  |  | Pitch (mm) | 0.9 | 0.9 | 0.9 | 0.9 |
|  |  | Absent Ratio (%) | 0 | 0 | 0 | 0 |
| Separation Membrane Element Performance |  | Fresh Water Production Rate (m³/day) | 29.2 | 29.8 | 33.3 | 33.0 |
|  |  | Desalination Ratio (%) | 97.7 | 97.7 | 98.5 | 98.5 |
|  |  | Peeling Ratio (%) | 45.1 | 33.0 | 3.1 | 4.0 |

TABLE 2

|  |  |  | Example 5 | Example 6 | Example 7 | Example 8 |
|---|---|---|---|---|---|---|
| Permeate-Side Channel Material | Nonwoven Fabric | Thickness (mm) | 0.05 | 0.05 | 0.05 | 0.05 |
|  |  | Material | Polyethylene terephthalate | Polyethylene terephthalate | Polyethylene terephthalate | Polyethylene terephthalate |
|  |  | Unit weight (g/m²) | 25 | 25 | 25 | 25 |
|  |  | Porosity (%) | 64 | 62 | 55 | 43 |
|  |  | Dense Fusion Ratio (%) | 25(23) | 29(27) | 34(33) | 40(38) |
|  |  | Pitch between Densely Fused Parts (mm) | <2.1 | <1.9 | <1.6 | <1.2 |
|  |  | Surface Pore Ratio (%) of Non-Fused Parts | 65(63) | 55(53) | 50(47) | 35(33) |
|  |  | Number of Pores (Pore: 150 to 200 μm) | 277(260) | 220(204) | 198(177) | 102(95) |
|  |  | Face Arithmetic Average Height (μm) | 5.5 | 5.5 | 5.4 | 5.2 |
|  |  | Shape of Densely Fused Part | Circle | Circle | Circle | Circle |
|  |  | Aspect Ratio | 1.0 | 1.0 | 1.0 | 1.0 |
|  |  | Pattern of Densely Fused Parts | — | — | — | — |
|  | Projections | Arrangement | Linear | Linear | Linear | Linear |
|  |  | Angle with Longitudinal Direction of Water Collection Tube (°) | 90 | 90 | 90 | 90 |
|  |  | Cross-Sectional Shape | Semicircle | Semicircle | Semicircle | Semicircle |
|  |  | Height H1 (mm) | 0.21 | 0.21 | 0.21 | 0.21 |
|  |  | Upper Bottom (mm) | 0.45 | 0.45 | 0.45 | 0.45 |
|  |  | Lower Bottom (mm) | 0.55 | 0.55 | 0.55 | 0.55 |
|  |  | Channel Material Distance b (mm) in First Direction (Widthwise Direction) | 0.40 | 0.40 | 0.40 | 0.40 |
|  |  | Width d (mm) of Channel Material | 0.50 | 0.50 | 0.50 | 0.50 |
|  |  | Channel Material Distance e (mm) in Second Direction (Lengthwise Direction) | 0 | 0.00 | 0.00 | 0.00 |
|  |  | Pitch (mm) | 0.9 | 0.9 | 0.9 | 0.9 |
|  |  | Absent Ratio (%) | 0 | 0 | 0 | 0 |
| Separation Membrane Element Performance |  | Fresh Water Production Rate (m³/day) | 33.0 | 32.5 | 32.4 | 32.0 |
|  |  | Desalination Ratio (%) | 98.4 | 98.3 | 98.3 | 98.2 |
|  |  | Peeling Ratio (%) | 4.6 | 7.1 | 7.9 | 13.1 |

TABLE 3

|  |  |  | Example 9 | Example 10 | Example 11 | Example 12 |
|---|---|---|---|---|---|---|
| Permeate-Side Channel Material | Nonwoven Fabric | Thickness (mm) | 0.05 | 0.05 | 0.05 | 0.05 |
|  |  | Material | Polyethylene terephthalate | Polyethylene terephthalate | Polyethylene terephthalate | Polyethylene terephthalate |
|  |  | Unit weight (g/m²) | 25 | 25 | 25 | 25 |
|  |  | Porosity (%) | 37 | 67 | 67 | 68 |
|  |  | Dense Fusion Ratio (%) | 48(46) | 15(14) | 15(14) | 15(14) |
|  |  | Pitch between Densely Fused Parts (mm) | <1.2 | 2.5 | 4.0 | 2.5 |
|  |  | Surface Pore Ratio (%) of Non-Fused Parts | 30(28) | 70(67) | 65(63) | 68(65) |

TABLE 3-continued

|  |  |  | Example 9 | Example 10 | Example 11 | Example 12 |
|---|---|---|---|---|---|---|
|  |  | Number of Pores (Pore: 150 to 200 μm) | 96(80) | 288(275) | 275(266) | 281(268) |
|  |  | Face Arithmetic Average Height (μm) | 4.0 | 5.6 | 5.4 | 5.5 |
|  |  | Shape of Densely Fused Part | Circle | Circle | Circle | Diamond shape |
|  |  | Aspect Ratio | 1.0 | 1.0 | 1.0 | 0.5 |
|  |  | Pattern of Densely Fused Parts | — | Lattice | Zigzag | Lattice |
|  | Projections | Arrangement | Linear | Linear | Linear | Linear |
|  |  | Angle with Longitudinal Direction of Water Collection Tube (°) | 90 | 90 | 90 | 90 |
|  |  | Cross-Sectional Shape | Semicircle | Semicircle | Semicircle | Semicircle |
|  |  | Height H1 (mm) | 0.21 | 0.21 | 0.21 | 0.21 |
|  |  | Upper Bottom (mm) | 0.45 | 0.45 | 0.45 | 0.45 |
|  |  | Lower Bottom (mm) | 0.55 | 0.55 | 0.55 | 0.55 |
|  |  | Channel Material Distance b (mm) in First Direction (Widthwise Direction) | 0.40 | 0.40 | 0.40 | 0.40 |
|  |  | Width d (mm) of Channel Material | 0.50 | 0.50 | 0.50 | 0.50 |
|  |  | Channel Material Distance e (mm) in Second Direction (Lengthwise Direction) | 0.00 | 0.00 | 0.00 | 0.00 |
|  |  | Pitch (mm) | 0.9 | 0.9 | 0.9 | 0.9 |
|  |  | Absent Ratio (%) | 0 | 0 | 0 | 0 |
| Separation Membrane Element Performance |  | Fresh Water Production Rate (m³/day) | 31.1 | 34.1 | 34.1 | 34.0 |
|  |  | Desalination Ratio (%) | 98.4 | 98.5 | 98.5 | 98.5 |
|  |  | Peeling Ratio (%) | 15.0 | 0.2 | 0.2 | 0.6 |

TABLE 4

|  |  |  | Example 13 | Example 14 |
|---|---|---|---|---|
| Permeate-Side Channel Material | Nonwoven Fabric | Thickness (mm) | 0.18 | 0.19 |
|  |  | Material | Polypropylene | Polyethylene terephthalate |
|  |  | Unit weight (g/m²) | 20 | 30 |
|  |  | Porosity (%) | 81 | 70 |
|  |  | Dense Fusion Ratio (%) | 13(12) | 15(14) |
|  |  | Pitch between Densely Fused Parts (mm) | 2.5 | 2.5 |
|  |  | Surface Pore Ratio (%) of Non-Fused Parts | 68(64) | 68(65) |
|  |  | Number of Pores (Pore: 150 to 200 μm) | 344(333) | 265(256) |
|  |  | Face Arithmetic Average Height (μm) | 9.5 | 8.8 |
|  |  | Shape of Densely Fused Part | Circle | Circle |
|  |  | Aspect Ratio | 1.0 | 1.0 |
|  |  | Pattern of Densely Fused Parts | Lattice | Lattice |
|  | Projections | Arrangement | Linear | Linear |
|  |  | Angle with Longitudinal Direction of Water Collection Tube (°) | 90 | 90 |
|  |  | Cross-Sectional Shape | Semicircle | Semicircle |
|  |  | Height H1 (mm) | 0.21 | 0.21 |
|  |  | Upper Bottom (mm) | 0.45 | 0.45 |
|  |  | Lower Bottom (mm) | 0.55 | 0.55 |
|  |  | Channel Material Distance b (mm) in First Direction (Widthwise Direction) | 0.40 | 0.40 |
|  |  | Width d (mm) of Channel Material | 0.50 | 0.50 |
|  |  | Channel Material Distance e (mm) in Second Direction (Lengthwise Direction) | 0.00 | 0.00 |
|  |  | Pitch (mm) | 0.9 | 0.9 |
|  |  | Absent Ratio (%) | 0 | 0 |
| Separation Membrane Element Performance |  | Fresh Water Production Rate (m³/day) | 0.41 | 0.45 |
|  |  | Desalination Ratio (%) | 98.8 | 98.7 |
|  |  | Peeling Ratio (%) | 2.3 | 4.0 |

TABLE 5

|  |  |  | Comparative Example 1 | Comparative Example 2 |
|---|---|---|---|---|
| Permeate-Side Channel Material | Nonwoven Fabric | Thickness (mm) | 0.05 | 0.04 |
|  |  | Material | Polyester film | Polyethylene terephthalate |
|  |  | Unit weight (g/m²) | — | 20 |
|  |  | Porosity (%) | 0 | 95 |
|  |  | Dense Fusion Ratio (%) | 100(100) | 0(0) |

TABLE 5-continued

|  |  | Comparative Example 1 | Comparative Example 2 |
|---|---|---|---|
|  | Pitch between Densely Fused Parts (mm) | — | — |
|  | Surface Pore Ratio (%) of Non-Fused Parts | 0(0) | 90(89) |
|  | Number of Pores (Pore: 150 to 200 μm) | 0(0) | 242(235) |
|  | Face Arithmetic Average Height (μm) | 1.0 | 16.3 |
|  | Shape of Densely Fused Part | — | — |
|  | Aspect Ratio | — | — |
|  | Pattern of Densely Fused Parts | — | — |
| Projections | Arrangement | Linear | Linear |
|  | Angle with Longitudinal Direction of Water Collection Tube (°) | 90 | 90 |
|  | Cross-Sectional Shape | Semicircle | Semicircle |
|  | Height H1 (mm) | 0.21 | 0.21 |
|  | Upper Bottom (mm) | 0.45 | 0.45 |
|  | Lower Bottom (mm) | 0.55 | 0.55 |
|  | Channel Material Distance b (mm) in First Direction (Widthwise Direction) | 0.40 | 0.40 |
|  | Width d (mm) of Channel Material | 0.50 | 0.50 |
|  | Channel Material Distance e (mm) in Second Direction (Lengthwise Direction) | 0 | 0.00 |
|  | Pitch (mm) | 0.9 | 0.9 |
|  | Absent Ratio (%) | 0 | 0 |
| Separation Membrane Element Performance | Fresh Water Production Rate (m³/day) | — | 34.1 |
|  | Desalination Ratio (%) | — | 98.5 |
|  | Peeling Ratio (%) | — | 0.2 |

The present invention has been illustrated in detail with reference to the specified embodiments. It will, however, be apparent to one skilled in the art that various changes and modifications can be made therein without departing from the spirit and scope of the invention. The present application is based on Japanese Patent Application No. 2014-264344 filed on Dec. 26, 2014, Japanese Patent Application No. 2015-087253 filed on Apr. 22, 2015 and Japanese Patent Application No. 2015-150355 filed on Jul. 30, 2015, the contents of which are incorporated herein by reference.

The separation membrane element of the present invention can be suitably used particularly for desalination of brackish water or seawater.

DESCRIPTION OF REFERENCE NUMERALS AND SIGNS

1 Separation membrane pair
11 Envelope-shaped membrane
2 Separation Membrane
2a Separation membrane (one separation membrane)
2b Separation membrane (the other separation membrane)
21 Feed-side face
21a Feed-side face
21b Feed-side face
22 Permeate-side face
22a Permeate-side face
22b Permeate-side face
201 Substrate
202 Porous supporting layer
203 Separation functional layer
31 Permeate-side channel material
32 Feed-side channel material
301 Projection
302 Sheet
303 Densely fused part
304 Coarsely fused part
305 Non-fused part
4 Membrane leaf
5 Permeate-side flow channel
6 Water collection tube
81 Exterior body
82 Porous member
91 End plate without holes
92 End plate with holes
100 Separation membrane element
a Length of separation membrane
b Distance between projections in the widthwise direction of the separation membrane
c Height of projections
d Width of projections
e Distance between projections in the lengthwise direction of the separation membrane
f Length of projections
R2 Region where the projection is provided from the inside to the outside in the winding direction of the separation membrane
R3 Region where the projection is not provided at the outside end in the winding direction of the separation membrane
L1 Length of separation membrane
L2 Length of region R2
L3 Length of region R3
100A Separation membrane element (first embodiment)
100B Separation membrane element (second embodiment)
100C Separation membrane element (third embodiment)
101 Raw water
102 Permeate
103 Concentrate

The invention claimed is:
1. A separation membrane element comprising:
separation membranes each having a feed-side face and a permeate-side face and forming a separation membrane pair by being arranged so that the permeate-side faces face each other; and
a permeate-side channel material provided between the permeate-side faces of the separation membranes,
wherein the permeate-side channel material comprises,
a sheet which is a porous sheet having pores on a surface thereof and has densely fused parts, coarsely fused parts and non-fused parts on the surface thereof; and a plurality of projections formed on the sheet, and the projections contain a resin, and a part of the resin is impregnated into the pores of the sheet.

2. The separation membrane element according to claim 1, wherein the sheet has a dense fusion ratio on the surface thereof of 5% to 50%.

3. The separation membrane element according to claim 1, wherein the non-fused parts have a surface pore ratio of 15% to 70%.

4. The separation membrane element according to claim 1, wherein, among the pores present per 100 mm$^2$ of the sheet surface, the number of pores having a pore size of 150 μm to 200 μm is 30 or more.

5. The separation membrane element according to claim 1, wherein the sheet surface has a face arithmetic average height of 3 μm to 10 μm.

6. The separation membrane element according to claim 1, wherein the densely fused parts on the sheet surface constitute a pattern.

* * * * *